United States Patent
Pandit et al.

(10) Patent No.: US 11,822,896 B2
(45) Date of Patent: Nov. 21, 2023

(54) CONTEXTUAL DIAGRAM-TEXT ALIGNMENT THROUGH MACHINE LEARNING

(71) Applicant: International Business Machines Corporation, Armonk, NY (US)

(72) Inventors: Sushain Pandit, Austin, TX (US); Sarbajit K. Rakshit, Kolkata (IN); Shikhar Kwatra, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 16/923,508

(22) Filed: Jul. 8, 2020

(65) Prior Publication Data

US 2022/0012434 A1  Jan. 13, 2022

(51) Int. Cl.
*G10L 17/20*   (2013.01)
*G06F 40/58*   (2020.01)
(Continued)

(52) U.S. Cl.
CPC .............. *G06F 40/58* (2020.01); *G06N 5/02* (2013.01); *G06N 5/04* (2013.01); *G06N 20/00* (2019.01);
(Continued)

(58) Field of Classification Search
CPC ..... G10L 15/1822; G10L 13/08; G06F 40/30; G06F 40/58; G06F 40/53; G06F 40/47;
(Continued)

(56) References Cited

U.S. PATENT DOCUMENTS

| 6,525,749 B1 | 2/2003 | Moran |
| 10,073,827 B2 | 9/2018 | Houston |
| (Continued) | | |

FOREIGN PATENT DOCUMENTS

| CA | 2266724 A | 4/1998 |
| CN | 107451582 A | * 12/2017 |
| (Continued) | | |

OTHER PUBLICATIONS

Qi J, Peng Y. Cross-modal Bidirectional Translation via Reinforcement Learning. InIJCAI Jul. 13, 2018 (pp. 2630-2636). (Year: 2018).*

(Continued)

*Primary Examiner* — Michael Ortiz-Sanchez
(74) *Attorney, Agent, or Firm* — Richard B. Thomas

(57) ABSTRACT

Embodiments relate to a system, program product, and method for leveraging cognitive systems to facilitate the bilateral contextual alignment of textual material and associated diagrammatic matter. The system, computer program product, and method disclosed herein facilitate leveraging a trained cognitive system to understand textual and diagrammatic patterns established by a user, and to learn to draft and edit such textual material and associated diagrammatic matter based on user behavior and preferences. The cognitive system is trained to bilaterally translate between textual material and diagrammatic matter, where the cognitive system includes natural language processing (NLP) features, diagram analytics features, and one or more user profiles. Machine-drafting of a document is achieved through the trained cognitive system such that first textual material and first diagrammatic matter, including first pictorial objects and first diagrammatic textual matter, are bilaterally translated into second textual material and second diagrammatic matter, which are combined and contextually aligned.

20 Claims, 15 Drawing Sheets

(51) Int. Cl.
*G06N 5/04* (2023.01)
*G06N 5/02* (2023.01)
*G06N 20/00* (2019.01)
*G06V 30/41* (2022.01)
*G06V 30/10* (2022.01)
*G06V 10/00* (2022.01)

(52) U.S. Cl.
CPC .............. *G06V 10/00* (2022.01); *G06V 30/10* (2022.01); *G06V 30/41* (2022.01)

(58) Field of Classification Search
CPC .......... G06F 40/56; G06F 40/55; G06F 40/10; G06F 40/103; G06F 40/117; G06F 40/14; G06F 40/154; G06F 40/16; G06F 40/194; G06F 40/20; G06F 40/258; G06F 40/274; G06F 40/279; G06F 40/284; G06F 40/289; G06F 40/40; G06F 16/5846; G06F 30/20; G06F 30/27; G06F 30/00; G06F 2111/12; G06F 16/40; G06F 16/50; G06N 5/00; G06N 5/04; G06N 5/042; G06N 5/046; G06N 5/02; G06N 5/025; G06N 20/00; G06Q 10/06; G06Q 10/103; G06Q 10/10; G06V 30/10; G06V 30/40; G06V 30/42; G06V 30/41; G06V 30/412; G06V 30/414; G06V 30/416; G06V 30/413; G06V 30/418; G06V 2201/01; G06V 10/00; G06V 10/10; G06V 10/40; G06V 10/70; G06V 10/96; G06V 30/14; G06V 30/19
See application file for complete search history.

(56) References Cited

U.S. PATENT DOCUMENTS

| | | |
|---|---|---|
| 2006/0059418 A1 | 3/2006 | Elkady |
| 2010/0332224 A1 | 12/2010 | Mäkelä |
| 2013/0198092 A1 | 8/2013 | Dugan |
| 2014/0122054 A1* | 5/2014 | Takano .................. G06F 9/454 704/2 |
| 2017/0371856 A1* | 12/2017 | Can ..................... G06F 16/5846 |

FOREIGN PATENT DOCUMENTS

| | | | |
|---|---|---|---|
| EP | 2122539 B1 | 8/2011 | |
| EP | 2080116 B1 | 7/2015 | |
| KR | 20230072454 A * | 11/2022 | .............. G06T 3/40 |
| WO | 2016033569 A1 | 3/2016 | |

OTHER PUBLICATIONS

Anonymous, "Method and Systems for Providing Anchor-Based Integration between Source and Diagram Editors without Model Translation," IP.com, Disclosure No. IPCOM000241831D, Jun. 2, 2015, 6 pages. <https://ip.com/IPCOM/000241831>.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

CONTEXTUAL DIAGRAM-TEXT ALIGNMENT THROUGH MACHINE LEARNING

BACKGROUND

The present disclosure relates to cognitive systems and the bilateral contextual alignment of textual material and associated diagrammatic matter, and, more specifically, to leveraging a trained cognitive system to bilaterally understand textual and diagrammatic patterns established by a user, and to learn to draft and edit such textual material and associated diagrammatic matter based on user behavior and preferences.

Many known documents include textual content and diagrams, such as flowcharts and illustrative figures that include visual artifacts that, along with the text, provide a cooperative effect that facilitates explaining aspects of the entire document in a clearer and more concise manner that would be achieved without the other. Therefore, both the diagrams and associated text are integral parts of a document. In a diagram, a reference number, typically an alphanumeric, is provided to precisely identify the subject object and provide a referential bridge to the respective text, where the diagrammatic object is more thoroughly explained. As diagrams are generated, different images of objects and icons, for example, are used that include visually recognizable attributes, e.g., an image of a vehicle, a human, a building, etc. Similarly, block diagrams and flowcharts may be provided, where any one block can represent various items. In such diagrams, there is typically a logical sequence that is instructive of the underlying idea or a series of decision-making points, etc. In most known instances, the expectation of the document generator and the readers is that the diagrams and the textual sections should be aligned with each other for better readability and understanding.

SUMMARY

A system, computer program product, and method are provided for bilateral contextual alignment of textual material and associated diagrammatic matter.

In one aspect, a computer system is provided to facilitate bilateral contextual alignment of textual material and associated diagrammatic matter. The system includes a server including at least one processing device and at least one memory device operably coupled to the at least one processing device. The system also includes a knowledge base in operable communication with the server. The server includes natural language processing (NLP) features, diagram analytics features, and one or more user profiles. The server is configured to train an artificial intelligence (AI) platform to bilaterally translate between textual material and diagrammatic matter, and machine-draft a document through the trained AI platform. The server is also configured to provide, to the trained AI platform, through the knowledge base, at least one of first textual material and first diagrammatic matter. The server is further configured to bilaterally translate, through the NLP features, the diagram analytics features, and the one or more user profiles, the at least one of the first textual material and the first diagrammatic matter to at least one of second textual material and second diagrammatic matter. The server is also configured to combine the second textual material and the second diagrammatic matter such that the second textual material and the second diagrammatic matter are contextually aligned.

In another aspect, a computer program product is provided to bilateral contextual alignment of textual material and associated diagrammatic matter. The computer program product includes one or more computer readable storage media, and program instructions collectively stored on the one or more computer storage media. The product includes program instructions to train an artificial intelligence (AI) platform to bilaterally translate between textual material and diagrammatic matter, and machine-draft a document through the trained AI platform. The product also includes program instructions to provide, to the trained AI platform, at least one of first textual material and first diagrammatic matter. The product further includes program instructions to bilaterally translate, through the NLP features, the diagram analytics features, and the one or more user profiles, the at least one of the first textual material and the first diagrammatic matter to at least one of second textual material and second diagrammatic matter. The product also includes program instructions to combine the second textual material and the second diagrammatic matter such that the second textual material and the second diagrammatic matter are contextually aligned.

In yet another aspect, a computer-implemented method is provided to facilitate bilateral contextual alignment of textual material and associated diagrammatic matter. The method includes training an artificial intelligence (AI) platform to bilaterally translate between textual material and diagrammatic matter. The AI platform includes natural language processing (NLP) features, diagram analytics features, and one or more user profiles. The method also includes machine-drafting a document through the trained AI platform, including providing, to the trained AI platform, at least one of first textual material and first diagrammatic matter. The method further includes bilaterally translating, through the NLP features, the diagram analytics features, and the one or more user profiles, the at least one of the first textual material and the first diagrammatic matter to at least one of the second textual material and second diagrammatic matter. The method also includes combining the second textual material and the second diagrammatic matter such that the second textual material and the second diagrammatic matter are contextually aligned.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
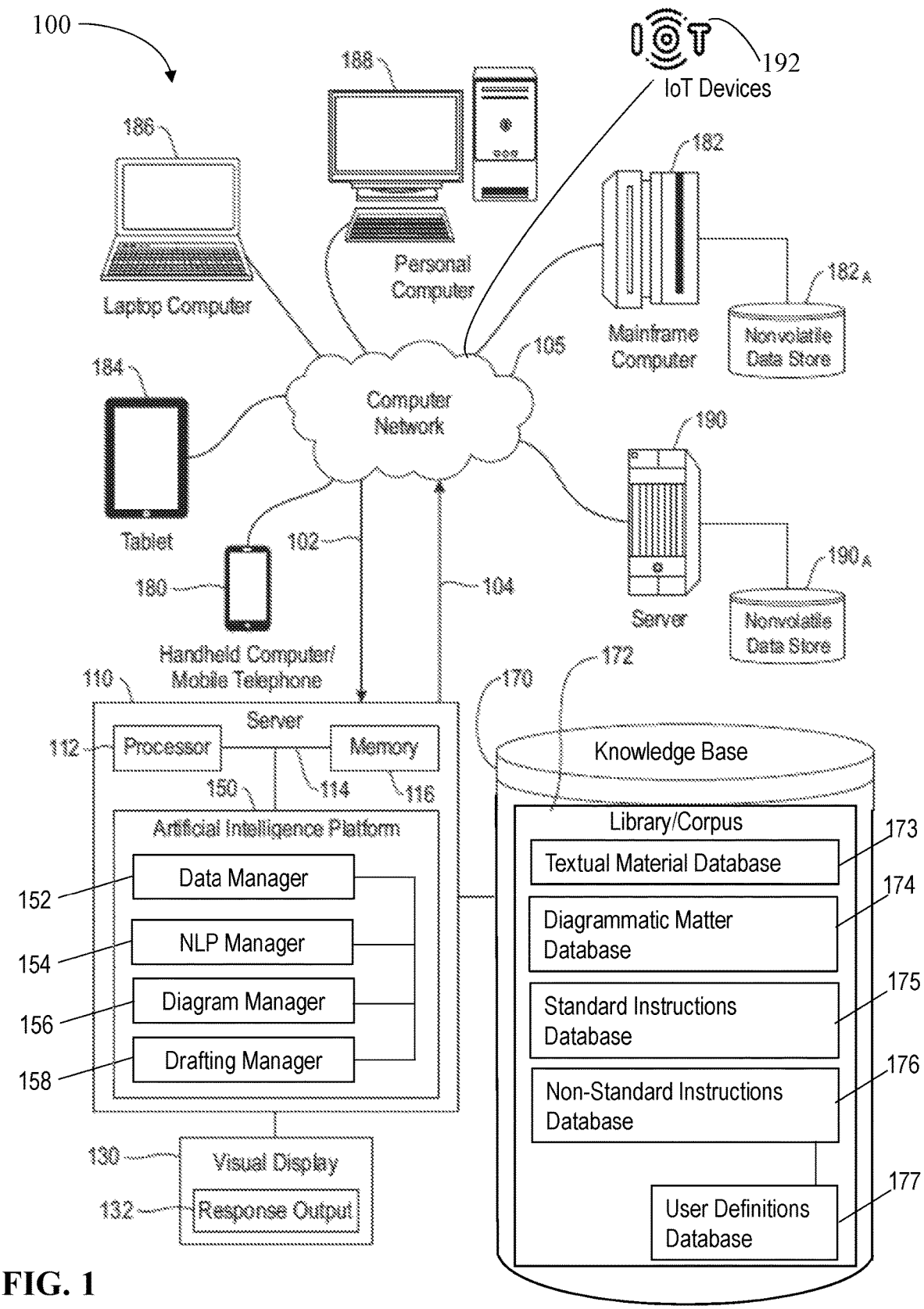
FIG. 1 is a schematic diagram illustrating a computer system including an artificial intelligence platform suitable for bilateral contextual alignment of textual material and associated diagrammatic matter, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known documents include textual content and diagrams, such as flowcharts and illustrative figures. Such documents include visual artifacts that, along with the text, provide a cooperative effect that facilitates explaining aspects of the entire document in a clearer and more concise manner than would be achieved with only one without the other. Practical examples of such known documents include, without limitation, architectural documents, technical and research papers, patent applications, formal project bids, and project management Gantt charts. Therefore, both the diagrams and associated text are integral parts of a document. In a diagram, a reference number, typically an alphanumeric, is provided to precisely identify the subject object and provide a referential bridge to the respective text, where the diagrammatic object is more thoroughly explained. As diagrams are generated, different images of objects and icons, for example, are used that include visually recognizable attributes, e.g., an image of a vehicle, a human, a building, etc. Similarly, block diagrams and flowcharts may be provided, where any one block can represent various items. In such diagrams, there is typically a logical sequence that is instructive of the underlying idea or a series of decision-making points, etc. In most known instances, the expectation of the document generator and the readers is that the diagrams and the textual sections should be aligned with each other for better readability and understanding.

A system, computer program product, and method are disclosed and described herein for cognitive systems and the bilateral contextual alignment of textual material and associated diagrammatic matter, and, more specifically, for leveraging a trained cognitive system to bilaterally understand textual and diagrammatic patterns established by a user, and to learn to draft and edit such textual material and associated diagrammatic matter based on user behavior and preferences. Such system, computer program product, and method significantly reduce a potential for writing a text fragment misaligned with a diagram or vice versa, thereby preventing conditions including not fully completing either the text fragment or the diagram that may result in a misalignment between the text and diagram. Many of the embodiments described herein reduce the reliance on the author exercising a substantial level of care and manual effort while writing text aligned with diagram, or vice versa. The system, computer program product, and method include a learning-based mechanism that can create formal structures of the text by analyzing the diagram and highlight the textual section that is not aligned with the diagram, and at the same time, it can also analyze the textual content to generate diagrams correctly aligned with the textual content.

For example, and without limitation, an artificial intelligence (AI) platform (discussed further herein) is used to facilitate data collection, curation, analysis, and correlation. The curated data is stored in a knowledge base, or knowledge corpus. In addition, the AI platform is trained with the curated knowledge. The trained AI platforms described herein bilaterally translate between textual material and diagrammatic matters. In at least some embodiments, the AI platform includes, without limitation, natural language processing (NLP) features, diagram analytics features, and one or more user profiles.

In order to facilitate consistency within this disclosure, the first textual material and the first diagrammatic matter are directed to the input to the AI platform once placed into production. The second textual material and the second diagrammatic matter are directed toward the output of the AI platform once placed into production. The third textual material and the third diagrammatic matter are directed to the input used to train the AI platform prior to being placed into production.

In some embodiments, data collection and curation facilitates building a knowledge corpus, where an intake of a plurality of third textual material and a third diagrammatic matter is conducted. The third diagrammatic matter includes one or more of third pictorial objects and third diagrammatic textual matter. In at least some embodiments, the curation of the third textual material and diagrammatic matter includes one or more volumes that have been collected historically. In some embodiments, the collection and curation may be performed in response to the need to train the AI platform on a particular type of document that it has not yet been trained. Moreover, in some embodiments, training the AI platform may include curating data associated with a particular technical subject, for example, and without limitation, computer science research and development and bridge construction projects. In general, data collection and curation will include gathering and ingesting various documents having one or more diagrams and associated textual descriptions. In some embodiments, practical examples of such documents include, without limitation, architectural documents, technical and research papers, patent applications, formal project bids, and project management Gantt charts.

In addition, in some embodiments, the curation of data to the AI platform includes determining, through the NLP features of the AI platform, one or more first semantic relationships within the plurality of third textual material. For example, the third textual material of a wind turbine generator embodiment may include, without limitation, technical description manuals, original equipment manufacturers' (OEM) assembly and maintenance manuals, operating manuals, OEM troubleshooting manuals, and OEM web-based advisories. In particular, in some embodiments, the determination of the first semantic relationships for the third textual material leads to a first contextual correlation of the third textual material. Therefore, while the third textual material may certainly vary in scope, a number of a contextual correlations between the texts will likely result due to the material being directed to a particular wind turbine generator and the substantial commonality of terms used therein, including terms of art. Accordingly, the AI platform analyzes the semantic flow of the textual content, and the semantic flow of the textual content indicates how the individual textual contents are contextually correlated, thereby establishing a better understanding of the textual content than would be achieved through examination of each reference in isolation.

In one or more embodiments, the third diagrammatic matter may include, without limitation, detailed assembly diagrams, exploded component diagrams, and one or more flowcharts directed toward assembly, routine operation, and maintenance. Each pictorial object of the third diagrammatic matter is labeled with reference alphanumerics and noun descriptors consistent with the respective third textual material. Specifically, during the curation process, each and every diagram portion is labelled individually. In some embodiments, the labeling is performed manually, and in some embodiments, the labeling is performed automatically through previous labeling training of the AI platform.

In addition, in one or more embodiments, the AI platform, through analyzing the diagrams, will also identify any image icons, for example, and without limitation, readily available vehicle icons, are used in the diagram, and will recognize the objects regardless of which diagram they are resident. Block diagrams will be analyzed to facilitate mapping the accompanying textual description for each of the blocks. In addition, the respective reference alphanumerics will be associated with each respective diagrammatic object and the reference alphanumerics within the respective portions of the textual material are identified, thereby establishing a cross-referencing of the textual descriptions of the diagrammatic objects at least partially through the reference alphanumerics. Accordingly, as discussed further herein, the AI platform is trained to recognize each third pictorial object in the third diagrammatic matter as an independent artifact based on the labeling of the third pictorial objects and will be further trained to recognize the reference alphanumerics.

In at least some embodiments, upon training the AI platform to recognize the assigned reference alphanumerics, and upon completion of the cross-referencing between the textual material and diagrammatic matter through the reference alphanumeric assignments, the AI platform analyzes the first pictorial objects and the first diagrammatic textual content within the third diagrammatic matter simultaneously while analyzing the respective first textual material through the respective reference alphanumerics. Then, in some embodiments, the AI platform performs a second contextual analysis of the third textual material and the third diagrammatic matter to facilitate performing a second contextual correlation through the third textual material and the third diagrammatic matter. The second contextual analysis and correlation identifies how different reference alphanumerics are annotated in the diagrams, and how the diagrams are correlated with the textual material.

In at least some embodiments, the curation of data to the AI platform includes defining one or more first mappings between respective portions of the plurality of third textual material and respective portions of the third diagrammatic matter. For example, in some embodiments, and without limitation, a textual description of the technical details of the design and construction of a wind turbine generator, one or more diagrams, and textual operating procedures, are curated into the knowledge base. The one or more diagrams may include diagrams illustrating the spectrum of depictions of the respective wind turbine generator from a single figure showing the major components to diagrams drilling down to more detailed illustrations, for example, and without limitation, details of installed instrumentation in rotor and stator windings. Accordingly, the curation process results in a first mapping of the plurality of third textual material and the third diagrammatic matter, where the mapping of the wind turbine generator textual material and diagrammatic matter (as discussed further herein) facilitates an alignment (also discussed further herein) of the technical subject matter between the descriptions, diagrams, and procedures.

In addition, in one or more embodiments, the NLP features, the diagram analytics features, and the one or more user profiles of the AI platform are employed to determine first textual patterns extending through the third textual material and the third diagrammatic textual content resident within the third diagrammatic matter. The first textual patterns are substantially based on the first mapping of the plurality of third textual material and the third diagrammatic matter.

Furthermore, in at least some embodiments, during the curation process, portions of the third textual material are contextually aligned with the respective portions of the third diagrammatic matter by the AI platform. Specifically, based on the first textual patterns determined between the third textual material and the third diagrammatic matter, the AI platform executes a first contextual alignment of the third textual material and the third diagrammatic matter. In at least some embodiments, when the third textual material and the third diagrammatic matter are contextually aligned, the technical context between the third technical material and the third diagrammatic textual content are aligned in relation to each other. For example, and without limitation, a textual description of an electric motor within a technical document and any textual content within any associated diagrams will be contextually aligned with each other, while the same electric motor description within the technical document and any diagrammatic content directed to material not related to electric motors remains unaligned contextually. Accordingly, the first contextual alignment is executed through the third textual material and third diagrammatic matter to facilitate generating a model of contextually aligned subject matter that will be used for aligning future subject matter.

In one or more embodiments, as discussed herein, the data collection, curation, analysis, and correlation facilitates populating the knowledge base with sufficient information to train the AI platform. In addition, the knowledge base may also be populated with standard instructions for automatically executing at least a portion of the associated activities. For example, when the AI platform is placed into production, instructions for standardizing the analyzing of the first textual material and the first diagrammatic matter to generate the semantic relations, the associated correlations, and the subsequent alignments therebetween are ingested. In addition, in some embodiments, the knowledge base is populated with standard diagrammatic notations including the associated symbology and the meaning of different portions of the diagrams, for example, and without limitation, directional arrows and decision diamonds. Moreover, in some embodiments, and as discussed further herein, the ingested standard instructions include instructions directed toward generating the second textual material and the second diagrammatic matter from the first textual material and the first diagrammatic matter once the AI platform is placed into production.

Furthermore, in one or more embodiments, the data collection and curation process includes collecting non-standard instructions to be used in training the AI platform to execute the activities as described herein. For example, such non-standard instructions may include user-defined instructions resident within one or more user profiles that are maintained in the knowledge base. Such user-defined instructions may be directed toward generating the second textual material and the second diagrammatic matter from the first textual material and first diagrammatic matter once the AI platform is placed into production. For example, in some embodiments, one or more particular users may prefer the term "capacitor" over the older term "condenser" when referring to electrical circuits. In such cases, for older ingested documents, the non-standard instructions will include instructions to convert the term "condenser" to "capacitor" when referring to capacitive devices and the standard schematic symbology in electrical circuit diagrams and the associated textual references.

In addition, in some embodiments, at least some of the non-standard instructions are directed to particular idiosyncrasies of particular users that are contained in the respective user profiles in the knowledge base. For example, a first draft of a machine-drafted document including the combination of second textual material and second diagrammatic matter is presented, and the user's editorial feedback on the machine-drafted document is collected. The user-defined instructions are updated subject to the editorial feedback, and the updated user-defined instructions are incorporating into future bilateral translation operations. In at least some embodiments, the standard instructions and the non-standard instructions may be implemented during the training of the AI platform.

Therefore, in one or more embodiments disclosed herein, the described performance of data collection, curation, analysis, and correlation of the third textual material and the third diagrammatic matter results in building a knowledge corpus that is used to train the AI platform to execute bilateral contextual alignment of textual material and associated diagrammatic matter. Specifically, the AI platform is trained to bilaterally understand textual and diagrammatic patterns established by a user, and to learn to draft and edit such textual material and associated diagrammatic matter based on user behavior and preferences. Accordingly, the AI platforms described herein are trained to recognize each first pictorial object in the first diagrammatic matter as an independent artifact based on the labeling of the first pictorial objects and is further trained to recognize the reference alphanumerics.

In at least some embodiments, upon completion of the training processes, the AI platforms described herein include features and capabilities to identify patterns that correlate textual material and diagrammatic matter. For example, in response to the ingestion of post-training first textual material and first diagrammatic matter, the AI platform will determine those portions of the diagram that need detailed descriptions and generate those descriptions. In addition, the AI platforms will analyze how the textual description is written for a specific diagram section, including, without limitation, how arrow directions describe the contextual flow of the content. Furthermore, the training of the AI platforms described herein provide the AI platforms with the features to determine those portions of the diagrams that need unique reference alphanumerics and will generate the reference alphanumerics and add to the diagrams and respective textual descriptions. Accordingly, the AI platforms described herein are configured to complete text and diagrams that are only partially drafted.

Further, in some embodiments, as part of the AI platform training process, the AI platform learns to determine, for any textual content that is written, if a diagram needs to be generated to complement the textual content. For such diagrams, the AI platform is trained to identify specific keywords from the textual documents, such as, and without limitation, the particular subject of the textual content, the source of the textual material, and previous processing of similar material. The AI platforms are also trained to determine correlations through the identified keywords, including, without limitation, interactions between the subjects associated with the keywords, and how those actions are performed. Furthermore, the AI platforms are trained to determine decision-making steps and the conditions that are used to make the appropriate decisions. Accordingly, the AI platforms described herein are trained and configured to determine, draft, and provide diagrammatic content to accompany respective textual content.

In addition, in some embodiments, the AI platforms described herein, are trained and configured to determine, for any ingested diagrammatic matter, if respective textual content needs to be generated within the context of any, or no, existing respective textual material, to complement the diagrammatic content. For such textual content, the AI platform is trained to identify specific objects within the diagrammatic content, the source of the diagrammatic content, keywords related to the diagrammatic objects, and previous processing of similar material. The AI platforms are also trained to determine correlations through the identified diagrammatic objects, including, without limitation, interactions between the objects, and how those actions are performed. Furthermore, the AI platforms are trained to recognize decision-making steps and the conditions that are used to make the appropriate decisions. Accordingly, the AI platforms described herein are trained and configured to determine, draft, and provide textual content to accompany respective diagrammatic content.

Upon completion of the training process, the trained AI platform is configured to machine-draft documents that include textual material and diagrammatic matter. The trained AI platform is provided one or more of a first textual material and a first diagrammatic matter including one or more of first pictorial objects and first diagrammatic textual matter. As previously discussed herein, the first textual material and the first diagrammatic matter are directed to the input to the AI platform once the trained AI platform is placed into production. The second textual material and the second diagrammatic matter are directed toward the output of the AI platform once placed into production. The third textual material and the third diagrammatic matter are directed to the training of the AI platform prior to being placed into production as previously described herein.

The trained AI platform bilaterally translates, through the NLP features, the diagram analytics features, and the one or more user profiles, first textual material and first diagrammatic matter, including first pictorial objects and first diagrammatic text, to second textual material and second diagrammatic matter, including second pictorial objects and second diagrammatic text. Upon successful translation, the second textual material and the second diagrammatic matter are aligned to define a substantially seamless product.

Specifically, in some embodiments, the bilateral translation is executed through the trained AI platform that is configured to receive the first textual material, with or without first diagrammatic matter, and generate second diagrammatic matter based on a contextual alignment with the first textual material. In addition, the trained AI platform may modify the first textual material to accommodate the generation of the second diagrammatic matter, thereby generating second textual material through a bilateral translation. Similarly, the trained AI platform is configured to receive first diagrammatic matter with or without first textual material, and generate second textual material based on a contextual alignment with the first diagrammatic matter. In addition, the trained AI platform may modify the first diagrammatic matter to accommodate the generation of the second textual material, thereby generating second diagrammatic matter through a bilateral translation.

In one or more embodiments, to enable the first textual material-to-second diagrammatic matter bilateral translation, the AI platform is configured to determine, through the NLP features, one or more second semantic relationships extending through the first textual material. In addition, the AI platform is configured to determine, subject to the second semantic relationships determination, for the first textual material, a third contextual correlation thereof. The second semantic relationships and the third contextual correlations for the first textual material are similar in nature to the first semantic relationships and first contextual correlations for the third textual material. Accordingly, as was done for the training of the AI platform with the third textual material, the AI platform ingests the first textual material and determines the associated second semantic relationships and third contextual correlations.

In some embodiments, the AI platform determines, subject to the third contextual correlation, an identity of one or more portions of the first textual material to be associated with one or more diagrams to be generated. The diagrams to be generated include at least a portion of the second diagrammatic matter. In at least some embodiments, first diagrammatic matter may also be ingested with the first textual material and may eventually be included with the second diagrammatic matter. The AI platform assigns, subject to the identity determination, a unique text identifier to each respective portion of the first textual material, thereby at least partially generating the second textual material. As discussed further herein, the respective unique text identifiers assigned to the text are used to facilitate generating the respective diagrams. From the text identifiers, the AI platform determines a total number of diagrammatic objects to be included in the second diagrammatic matter, a number of the diagrams to be generated, the order of the diagrams, and a set of diagrammatic objects to be drawn on each diagram. For those embodiments that include flowcharts, the AI platform determines a total number of flowchart blocks to be generated, the textual content to be added to each flowchart block, the type of flowchart icon to be used, a number of the flowcharts to be generated, and the order of the flowcharts.

In one or more embodiments, the AI platform determines, subject to the diagrammatic objects determinations, one or more reference alphanumerics to be assigned to each diagrammatic object, including if appropriate, flowchart blocks. The AI platform maps the respective reference alphanumerics to the respective unique text identifiers. Then the AI platform generates the diagrams through the previously mentioned mapping of the respective reference alphanumerics to the respective unique text identifiers. As the second diagrammatic matter is generated, the AI platform analyzes the contextual flow of the first textual material, and if at least partially generated, the second textual material, thereby executing a bilateral second contextual alignment between the first textual material and the second diagrammatic matter, thereby at least partially generating the second textual material. Therefore, the AI platform combines the second textual material and the second diagrammatic matter, where the second textual material and the second diagrammatic matter are contextually aligned. The second diagrammatic matter includes the pictorial objects, the flowchart blocks, and the respective reference alphanumerics such that one or more complete diagrams are generated that substantially match the respective text in the second textual material. The second textual material provides the associated descriptions of the pictorial objects through the mapping facilitated by the respective unique text identifiers, where the respective reference alphanumerics are now also resident within the second textual material. Accordingly, the first textual material, and in some cases, the first diagrammatic matter, are bilaterally translated into the second textual material and the second diagrammatic matter that share a contextual alignment.

Similarly, in one or more embodiments, to enable the first diagrammatic matter-to-second textual material bilateral translation, the AI platform is configured to identify the one or more diagrams within the first diagrammatic matter, regardless of whether the diagrams are substantially complete or not. Also, the AI platform analyzes, subject to the identification determination, the one or more diagrams of the first diagrammatic matter. Subject to the results of the analysis, the AI platform determines the portions of the one or more diagrams to be associated with second textual material that is to be generated. In some embodiments, first textual material may also be ingested with the first diagrammatic matter and may eventually be included with the second textual material. The analysis includes determining, without limitation, the number and nature of the pictorial objects, including the type of flowchart items, the relative positions thereof, any connection lines and arrows therebetween, and any existing diagrammatic text and markings.

Also, in some embodiments, the AI platform is configured to assign, subject to the association determination, one or more unique reference alphanumerics to each respective diagrammatic object of the second diagrammatic matter, thereby at least partially generating the second diagrammatic matter. The assigned unique reference alphanumerics facilitate the pending contextual alignment between the diagrammatic objects and the pending text to be generated. Also, subject to the association determination, an extent and order of the second textual material to be generated is determined based on the scope and extent of the first diagrammatic matter. Furthermore, the AI platform is configured to generate the one or more unique reference alphanumerics from the respective one or more diagrams that are to be referenced within the second textual material as it is generated, mapping the one or more reference alphanumerics to the respective second textual material as it is generated, and generating the second textual material accordingly. As the AI platform generates the text through the previously mentioned mapping of the respective reference alphanumerics to the respective to the respective second textual material. As the second textual matter is generated, the AI platform analyzes the contextual flow of the second textual material, and if at least partially generated, the second diagrammatic matter, thereby executing a bilateral third contextual alignment between the second textual material and the second diagrammatic matter, thereby at least partially generating the second diagrammatic matter.

Therefore, the AI platform combines the second textual material and the second diagrammatic matter, where the second textual material and the second diagrammatic matter are contextually aligned. The second textual matter includes the text and the respective reference alphanumerics from the one or more complete diagrams that define the second diagrammatic matter. The second textual material provides the associated descriptions of the pictorial objects through the mapping facilitated by the respective reference alphanumerics that are now also resident within the second diagrammatic matter. Accordingly, the first diagrammatic matter, and in some cases, the first textual material, are bilaterally translated into the second textual material and the second diagrammatic matter that share a contextual alignment.

In at least some embodiments, the AI platform is configured to continue the training and learning process after it has been placed into production and is bilaterally generating the contextually aligned second textual material and the second diagrammatic matter. In some embodiments, a user executes first changes to one of the second textual material and the second diagrammatic matter. The changes may be executed to correct an error in the generation of the second textual material and the second diagrammatic matter or to implement revisions to the text and diagrams. The AI platform is configured to determine, subject to the executed changes, one or more discrepancies between the second textual material and the second diagrammatic matter resulting from the executed changes. The discrepancies at least partially impact a synchronization of the contextual alignment between second textual material and the second diagrammatic matter.

In addition, in light of the discrepancy determination, the AI platform is configured to determine one or more locations within the second textual material and the second diagrammatic matter where the lack of synchronization is present between the second textual material and the second diagrammatic matter. The AI platform is configured to execute second changes to either, or both, the second textual material and the second diagrammatic matter to remove the one or more discrepancies and obtain, or restore synchronization therebetween. In the event that the editing of the second textual material or the second diagrammatic matter is to correct errors introduced during the generation thereof, the AI platform is configured to determine that the first changes and the second changes are training feedback, update the knowledge corpus with the first changes and the second changes, and update the training of the AI platform with the updated knowledge corpus. Similarly, if the editing of the second textual material or the second diagrammatic matter is to implement revisions to the text and diagrams, the training and learning features of the AI platform may still be used to provide the AI platform with addition drafting knowledge. Accordingly, the AI platforms as described herein are configured to continually train themselves through continued production.

Artificial Intelligence (AI) is one example of cognitive systems that relate to the field of computer science directed at computers and computer behavior as related to humans. Cognitive computing utilizes self-teaching algorithms that use data, visual recognition, and natural language processing (NLP) to solve problems and optimize human processes. The NLP features analyze the collected relevant material as subject matter data as received from the sources as discussed herein. As the subject matter data is received, organized, and stored, the NLP features analyze the data to determine the relevant details through computational linguistics that provides parsing and semantic interpretation of the received text, which allows the associated systems to learn, analyze, and understand human language, including within the context of the present disclosure. With such an understanding, the AI can surface concepts, categories, sentiment, and emotion, and apply the acquired knowledge to extract the relevant portions of the received material.

In addition, cognitive systems such as AI, based on information, are able to make decisions, which maximizes the chance of success in a given topic. More specifically, AI is able to learn from a data set to solve problems and provide relevant recommendations. For example, in the field of artificial intelligent computer systems, machine learning (ML) systems process large volumes of data, seemingly related or unrelated, where the ML systems may be trained with data derived from a database or corpus of knowledge. The ML systems look for, and determine, patterns, or lack thereof, in the data, "learn" from the patterns in the data, and ultimately accomplish tasks without being given specific instructions. In addition, the ML systems, utilizes algorithms, represented as machine processable models, to learn from the data and create foresights based on this data. More specifically, ML is the application of AI, such as, and without limitation, through creation of neural networks that can demonstrate learning behavior by performing tasks that are not explicitly programmed. Deep learning is a type of neural-network ML in which systems can accomplish complex tasks by using multiple layers of choices based on output of a previous layer, creating increasingly smarter and more abstract conclusions.

ML learning systems may have different "learning styles." One such learning style is supervised learning, where the data is labeled to train the ML system through telling the ML system what the key characteristics of a thing are with respect to its features, and what that thing actually is. If the thing is an object or a condition, the training process is called classification. Supervised learning includes determining a difference between generated predictions of the classification labels and the actual labels, and then minimize that difference. If the thing is a number, the training process is called regression. Accordingly, supervised learning specializes in predicting the future.

A second learning style is unsupervised learning, where commonalities and patterns in the input data are determined by the ML system through little to no assistance by humans. Most unsupervised learning focuses on clustering, i.e., grouping the data by some set of characteristics or features. These may be the same features used in supervised learning, although unsupervised learning typically does not use labeled data. Accordingly, unsupervised learning may be used to find outliers and anomalies in a dataset, and cluster the data into several categories based on the discovered features.

Semi-supervised learning is a hybrid of supervised and unsupervised learning that includes using labeled as well as unlabeled data to perform certain learning tasks. Semi-supervised learning permits harnessing the large amounts of unlabeled data available in many use cases in combination with typically smaller sets of labelled data. Semi-supervised classification methods are particularly relevant to scenarios where labelled data is scarce. In those cases, it may be difficult to construct a reliable classifier through either supervised or unsupervised training. This situation occurs in application domains where labelled data is expensive or difficult obtain, like computer-aided diagnosis, drug discovery and part-of-speech tagging. If sufficient unlabeled data is available and under certain assumptions about the distribution of the data, the unlabeled data can help in the construction of a better classifier through classifying unlabeled data as accurately as possible based on the documents that are already labeled.

The third learning style is reinforcement learning, where positive behavior is "rewarded: and negative behavior is "punished." Reinforcement learning uses an "agent," the agent's environment, a way for the agent to interact with the environment, and a way for the agent to receive feedback with respect to its actions within the environment. An agent may be anything that can perceive its environment through sensors and act upon that environment through actuators. Therefore, reinforcement learning rewards or punishes the ML system agent to teach the ML system how to most appropriately respond to certain stimuli or environments. Accordingly, over time, this behavior reinforcement facilitates determining the optimal behavior for a particular environment or situation.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing devices that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Therefore, deep learning is used to predict an output given a set of inputs, and either supervised learning or unsupervised learning can be used to facilitate such results.

Referring to FIG. 1, a schematic diagram is provided illustrating a computer system 100, that in the embodiments described herein, is a contextual diagram-text alignment system 100 that is configured to train one or more models to facilitate bilateral contextual alignment of textual material and associated diagrammatic matter, and, more specifically, for leveraging a trained cognitive system to bilaterally understand textual and diagrammatic patterns established by a user, and to learn to draft and edit such textual materials and associated diagrammatic matter based on user behavior and preferences. In at least one embodiment, the machine-trained system 100 is embodied as a cognitive system, i.e., an artificial intelligence (AI) platform computing system that includes an artificial intelligence platform 150 suitable for establishing bilateral contextual alignment of textual material and associated diagrammatic matter.

As shown, a server 110 is provided in communication with a plurality of computing devices 180, 182, 184, 186, 188, 190, and 192 across a computer network connection 105. The computer network connection 105 may include several information handling devices. Types of information handling devices that can utilize the machine-trained system 100 range from small handheld devices, such as a handheld computer/mobile telephone 180 to large mainframe systems, such as a mainframe computer 182. Examples of information handling systems includes, personal digital assistants (PDAs), personal entertainment devices, pen or tablet computer 184, laptop or notebook computer 186, personal computer system 188, server 190, and one or more Internet of Things (IoT) devices 192, that in at least some embodiments, include connected cameras. As shown, the various information handling systems can be networked together using the computer network connection 105.

Various types of a computer networks can be used to interconnect the various information handling systems, including Local Area Networks (LANs), Wireless Local Area Networks (WLANs), the Internet, the Public Switched Telephone Network (PSTN), other wireless networks, and any other network topology that can be used to interconnect information handling systems and computing devices as described herein. Many of the information handling systems include non-volatile data stores, such as hard drives and/or non-volatile memory. Some of the information handling systems may use separate non-volatile data stores, e.g., server 190 utilizes non-volatile data store 190a, and mainframe computer 182 utilizes non-volatile data store 182a. The non-volatile data store 182a can be a component that is external to the various information handling systems or can be internal to one of the information handling systems.

The server 110 is configured with a processing device 112 in communication with memory 116 across a bus 114. The server 110 is shown with the artificial intelligence (AI) platform 150 for cognitive computing, including machine learning, over the computer network connection 105 from one or more of the computing devices 180, 182, 184, 186, 188, 190, and 192. More specifically, the computing devices 180, 182, 184, 186, 188, 190, and 192 communicate with each other and with other devices or components via one or more wired and/or wireless data communication links, where each communication link may comprise one or more of wires, routers, switches, transmitters, receivers, or the like. In this networked arrangement, the server 110 and the computer network connection 105 enable communication, detection, recognition, and resolution. The server 110 is in operable communication with the computer network through communications links 102 and 104. Links 102 and 104 may be wired or wireless. Other embodiments of the server 110 may be used with components, systems, subsystems, and/or devices other than those that are depicted herein.

The AI platform 150 is shown herein configured with tools to enable one or more of learning techniques to execute bilateral contextual alignment of textual material and associated diagrammatic matter. More specifically, the AI platform 150 is configured for leveraging a trained cognitive system to bilaterally understand textual and diagrammatic patterns established by a user, and to learn to draft and edit such textual material and associated diagrammatic matter based on user behavior and preferences. Moreover, the AI platform 150 is configured to significantly reduce a potential for writing a text fragment misaligned with a diagram or vice versa, thereby preventing conditions including not fully completing either the text fragment or the diagram that may result in a misalignment between the text and diagram. Many of the embodiments of the AI platform 150 described herein reduce the reliance on the author exercising a substantial level of care and manual effort while writing text aligned with diagram, or vice versa. The AI platform 150 includes a learning-based mechanism that can create formal structures of the text by analyzing the diagram and highlight the textual sections that are not aligned with the diagram, and at the same time, it can also analyze the textual content to generate diagrams correctly aligned with the textual content.

The tools shown herein include, but are not limited to, a data manager 152, a natural language processing (NLP) manager 154, a diagram manager 156, and a drafting manager 158, where the data manager 152, the NLP manager 154, the diagram manager 156, and the drafting manager 158 include the machine learning (ML) features. The data manager 152, the NLP manager 154, the diagram manager 156, and the drafting manager 158 are described further herein with respect to FIGS. 2-7.

The AI platform 150 may receive input from the computer network 105 and leverage a knowledge base 170, also referred to herein as a data source, to selectively access training and other data. The knowledge base 170 is provided operably coupled to the server 110 including the processing device 112 and/or memory 116. In at least one embodiment, the knowledge base 170 may be directly operably coupled to the server 110. In some embodiments, the knowledge base 170 is communicatively coupled to the server 110 across the computer network connection 105. In at least one embodiment, the knowledge base 170 includes a library 172, or knowledge corpus 172 that may be in the form of one or more databases. The knowledge corpus 172 includes different databases, including, but not limited to, a textual material database 173, a diagrammatic matter database 174, a standard instructions database 175, a non-standard instructions database 176, and a user definitions database 177 where the databases 173-177 are described further herein. Accordingly, the server 110 including the AI platform 150, data manager 152, the NLP manager 154, the diagram manager 156, and the drafting manager 158 receive information from the computer network connection 105 and the devices connected thereto, and the knowledge base 170.

In at least some embodiments, the textual material database 173 includes the textual material collected by the data manager 152 from one or more sources. In one or more embodiments, the textual material includes all textual material collected and generated by the contextual diagram-text alignment system 100. Similarly, the diagrammatic matter database 174 includes the diagrammatic matter collected by the data manager 152 from one or more sources. In one or more embodiments, the diagrammatic matter include all diagrammatic matter collected and generated by the contextual diagram-text alignment system 100. Accordingly, the textual material and the diagrammatic matter are collected, generated, and managed within their respective databases 173 and 174 by the data manager 152.

In some embodiments, the standard instructions database 175 includes ingested instructions directed toward generating second textual material and second diagrammatic matter from first textual material and first diagrammatic matter once the AI platform 150 is placed into production, and as described further herein. In some embodiments, such standard instructions include, without limitation, dictionaries, thesauruses, text drafting manuals, diagram drafting manuals, diagrammatic objects and icons, textual and diagrammatic templates, and business standards. Accordingly, the standard instructions are used to train the AI platform 150 to execute the operations as described further herein to enable operation of the contextual diagram-text alignment system 100.

Also, in some embodiments, the non-standard instructions database 176 includes, for example, and without limitation, business or client requirements that may differ from similar requirements in the standard instructions database 175. In addition, the user definitions database 177 is embedded within, or communicatively coupled to, the non-standard instructions database 176. The user-defined instructions are resident within one or more user profiles that are maintained in the knowledge base 170, including, without limitation, the user definitions database 177. Such user-defined instructions may be directed toward generating the second textual material and the second diagrammatic matter from the first textual material and first diagrammatic matter once the AI platform 150 is placed into production. In addition, in some embodiments, at least some of the user-defined instructions are directed to particular idiosyncrasies of particular users that are contained in the respective user profiles in the knowledge base 170. Accordingly, the non-standard instructions are used to train the AI platform 150 to execute the operations as described further herein to enable operation of the contextual diagram-text alignment system 100.

A response output 132 includes, for example, and without limitation, output generated in response to a query of the knowledge corpus 172 that may include some combination of diagrammatic and textual output. Further details of the information displayed is described with respect to FIGS. 3-7.

In at least one embodiment, the response output 132 is communicated to a corresponding network device, shown herein as a visual display 130, operatively coupled to the server 110 or in at least one other embodiment, operatively coupled to one or more of the computing devices 180-192 across the computer network connection 105.

The computer network connection 105 may include local network connections and remote connections in various embodiments, such that the artificial intelligence platform 150 may operate in environments of any size, including local and global, e.g., the Internet. Additionally, the AI platform 150 serves as a front-end system that can make available a variety of knowledge extracted from or represented in network accessible sources and/or structured data sources. In this manner, some processes populate the AI platform 150, with the AI platform 150 also including one or more input interfaces or portals to receive requests and respond accordingly.

Figure 2:
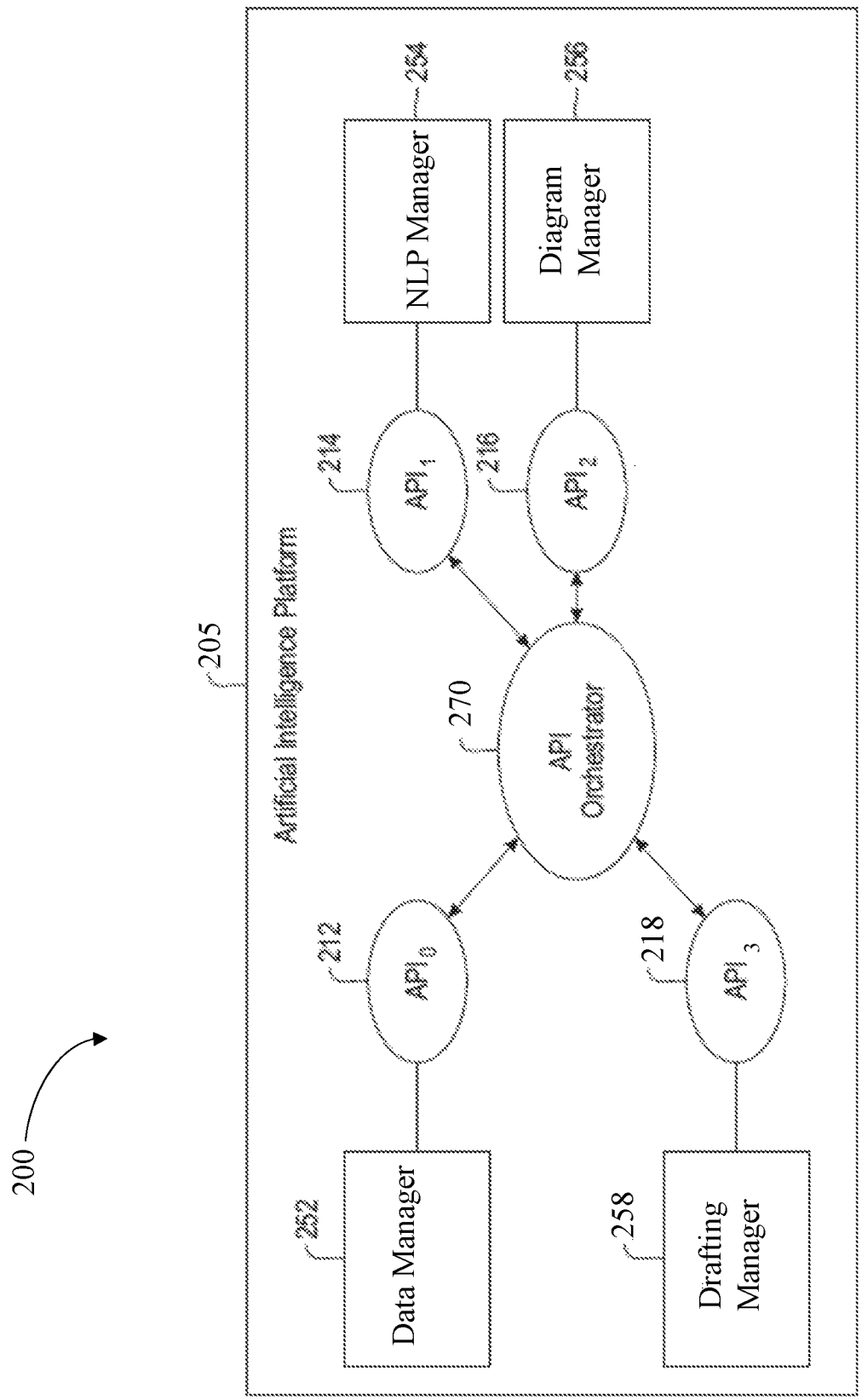
FIG. 2 is a block diagram illustrating artificial intelligence platform tools, as shown and described in FIG. 1, and their associated application program interfaces, in accordance with some embodiments of the present disclosure.

An Application Program Interface (API) is understood in the art as a software intermediary, e.g., invocation protocol, between two or more applications which may run on one or more computing environments. With respect to the AI platform 150 shown and described in FIG. 1, one or more APIs may be utilized to support one or more of the tools 152-158 and their associated functionality. Referring to FIG. 2, a block diagram 200 is provided illustrating the tools 252-258 and their associated APIs. As shown, a plurality of tools is embedded within the AI platform 205, that is equivalent to the AI platform 150 (shown in FIG. 1). The AI platform 205 includes the tools including, but not limited to, the data manager 152 (shown herein as 252) associated with $API_0$ 212, the NLP manager 154 (shown herein as 254) associated with $API_1$ 214, the diagram manager 156 (shown herein as 256) associated with $API_2$ 216, and the drafting manager 158 (shown herein as 258) associated with $API_3$ 218.

Each of the APIs may be implemented in one or more languages and interface specifications. $API_0$ 212 provides functional support for, without limitation, the data manager 252 that is configured to facilitate execution of one or more operations by the server 110. Such operations include, without limitation, collecting, storing, and recalling the data stored within the databases 173-177 as discussed herein, and providing data management and transmission features not provided by the other three managers 254-258. Accordingly, the data manager 252 is configured to facilitate building the knowledge corpus 172 including, without limitation, curation of an intake of the textual material and diagrammatic matter.

$API_1$ 214 provides functional support for, without limitation, the NLP manager 254 employing a natural language processing (NLP) engine (not shown) to facilitate execution of one or more operations by the server 110. Such operations include, without limitation, determining one or more semantic relationships between selected volumes of textual material and determining contextual correlations between the selected volumes of textual material based on the semantic relationships. In addition, the NLP manager 254 determines, subject to a determination of portions of the one or more diagrams to be associated with second textual material to be generated, an extent of the second textual material to be generated, and, subject to the extent determination, determines an order of the second textual material to be generated.

$API_2$ 216 provides functional support for, without limitation, the diagram manager 256 to facilitate execution of one or more operations by the server 110. Such operations include, without limitation, facilitating, through at least a portion of the embedded diagram analytics, labeling pictorial objects resident within the selected volumes of diagrammatic matter with generated reference alphanumerics and noun descriptors consistent with the respective selected textual material. In addition, the $API_2$ 216 provides functional support to the diagram manager 256 for training the AI platform 150 to recognize each labeled pictorial object and the reference alphanumerics and to analyze the pictorial objects and the diagrammatic textual content simultaneously with analyzing the respective third textual material by the NLP manager 254. Moreover, the $API_2$ 216 provides functional support to the diagram manager 256 for determining, through the diagram analytics, a number of the diagrams to be generated, an order of the diagrams, and, a set of diagrammatic objects to be drawn on each diagram. Furthermore, the $API_2$ 216 provides functional support to the diagram manager 256 for determining, through the diagram analytics, an identity of one or more diagrams of the first diagrammatic matter, analyzing diagrams of the selected volumes of the diagrammatic matter, and determining the portions of the one or more diagrams to be associated with textual material to be generated. In addition, the $API_2$ 216 provides functional support to the diagram manager 256 for generating the respective diagrams.

$API_3$ 218 provides functional support for, without limitation, the drafting manager 258 to facilitate execution of one or more operations by the server 110. In some embodiments, such operations include, without limitation, defining mappings between respective portions of the selected volumes of textual material and respective portions of the selected volumes of the diagrammatic matter. Moreover, the $API_3$ 218 provides functional support to the drafting manager 258 to determine textual patterns extending through the selected volumes of textual material and diagrammatic textual content resident within selected volumes of diagrammatic matter. In addition, the $API_3$ 218 provides functional support to the drafting manager 258 to execute contextual alignments between the selected volumes of textual material and the selected volumes of the diagrammatic matter, and contextual alignments between respective portions of the pictorial objects and reference alphanumerics with respective portions of the selected volumes of textual material. Furthermore, the $API_3$ 218 provides functional support to the drafting manager 258 to assign the reference alphanumerics to each pictorial object within the selected volumes of the diagrammatic matter. Moreover, the $API_3$ 218 provides functional support to the drafting manager 258 to determine an identity of one or more portions of the selected volumes of textual material to be associated with one or more diagrams to be generated and assign a unique text identifier to each respective portion of the selected volumes of textual material, thereby at least partially generating the selected volumes of textual material.

In addition, the $API_3$ 218 provides functional support to the drafting manager 258 to determine the unique reference alphanumerics to be generated and assigned to each diagrammatic object and inserted into the respective portions of the selected volumes of textual material that are based on defined mappings between the reference alphanumerics and respective unique text identifiers, and the reference alphanumerics and the respective textual material to be generated. Moreover, the $API_3$ 218 provides functional support to the drafting manager 258 to execute a bilateral contextual alignment between the selected textual material and the selected diagrammatic matter. In addition, the $API_3$ 218 provides functional support to the drafting manager 258 for generating the respective textual material.

Furthermore, the $API_3$ 218 provides functional support to the drafting manager 258 to execute changes to the selected volumes of textual material and diagrammatic matter, and determine, subject to the executed changes, one or more discrepancies between the textual material and the diagrammatic matter. Moreover, the $API_3$ 218 provides functional support to the drafting manager 258 to determine, subject to the discrepancy determination, locations within the textual material and the diagrammatic matter where a lack of synchronization is present between the textual material and the diagrammatic matter. In addition, the API$_3$ 218 provides functional support to the drafting manager 258 to execute the respective changes to the textual material and the diagrammatic matter to obtain synchronization therebetween, thereby removing the one or more discrepancies.

As shown, each of the APIs 212, 214, 216, and 218 are operatively coupled to an API orchestrator 270, otherwise known as an orchestration layer, which is understood in the art to function as an abstraction layer to transparently thread together the separate APIs. In at least one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
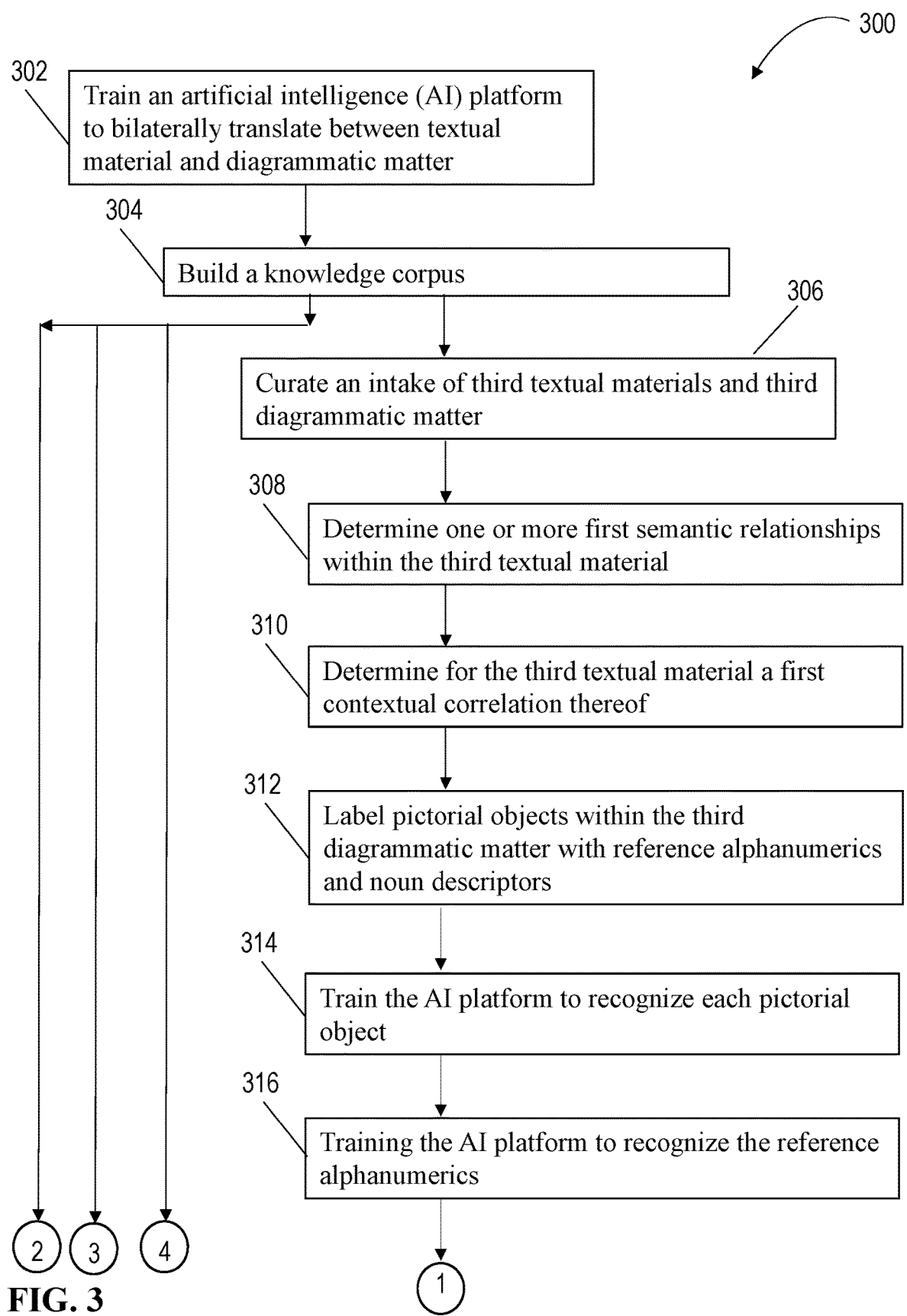
FIG. 3 is a flowchart of a process for training an AI platform to execute bilateral contextual alignment of textual material and associated diagrammatic matter, in accordance with some embodiments of the present disclosure.
Figure 3:
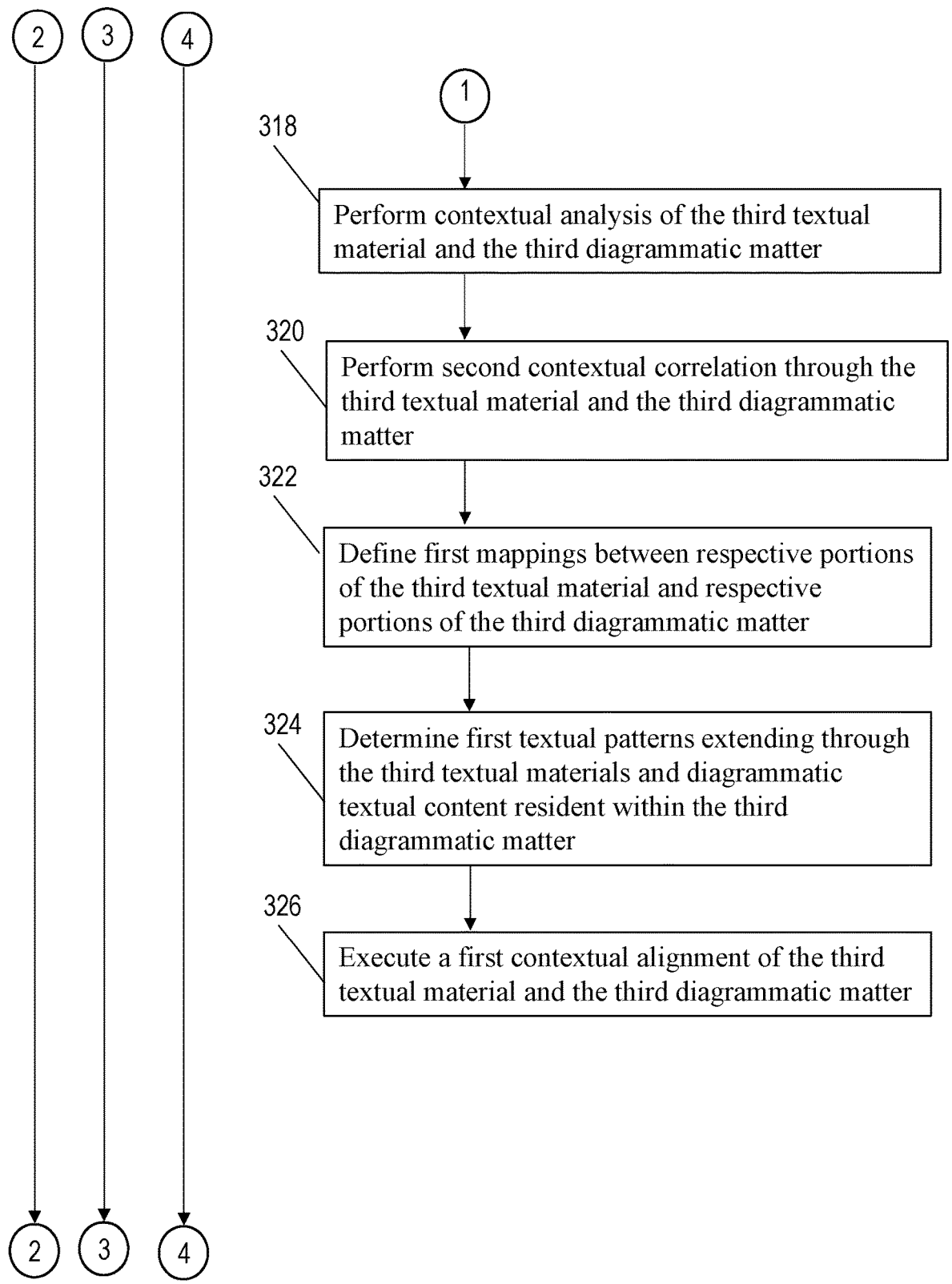
Figure 3:
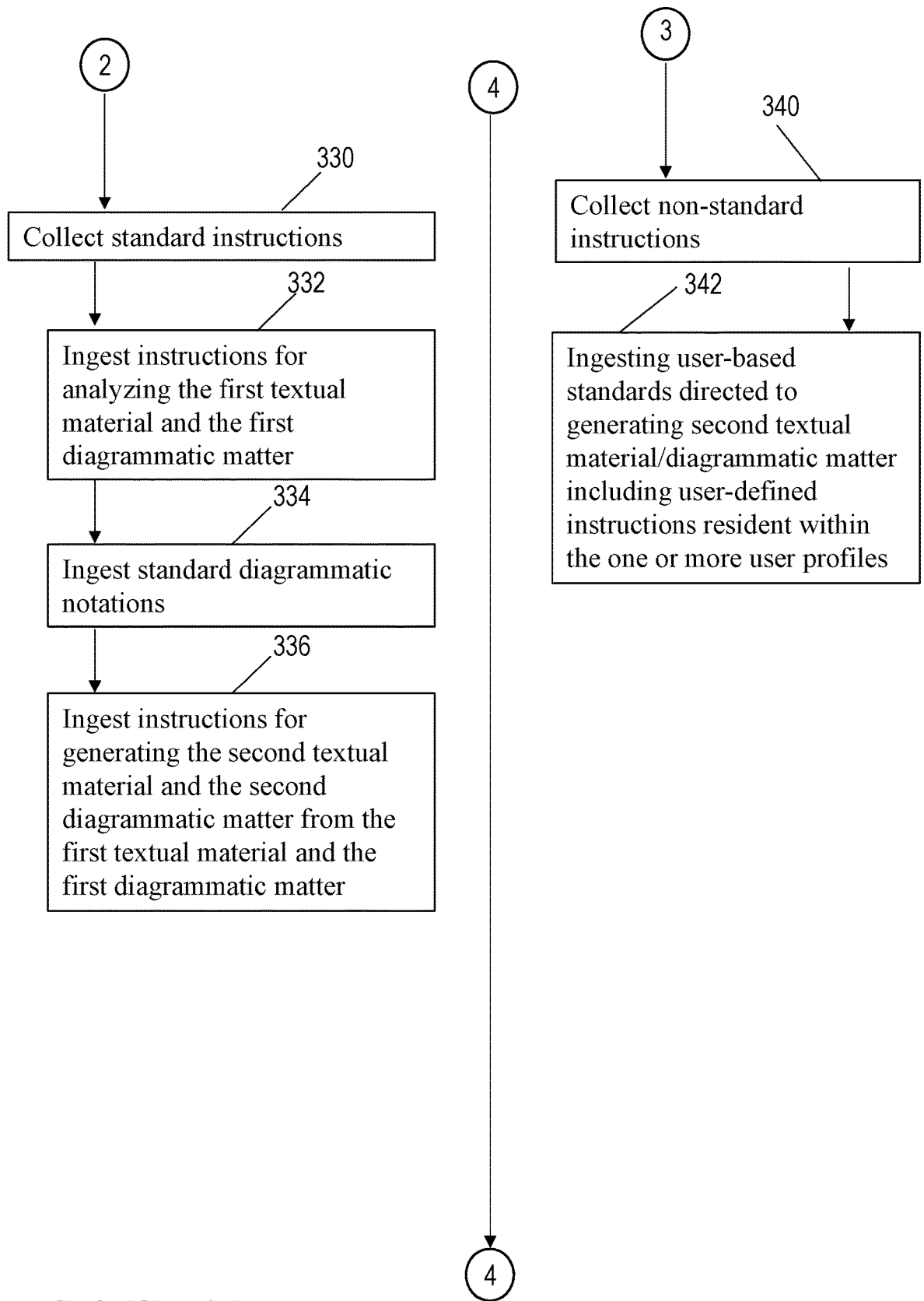
Figure 3:
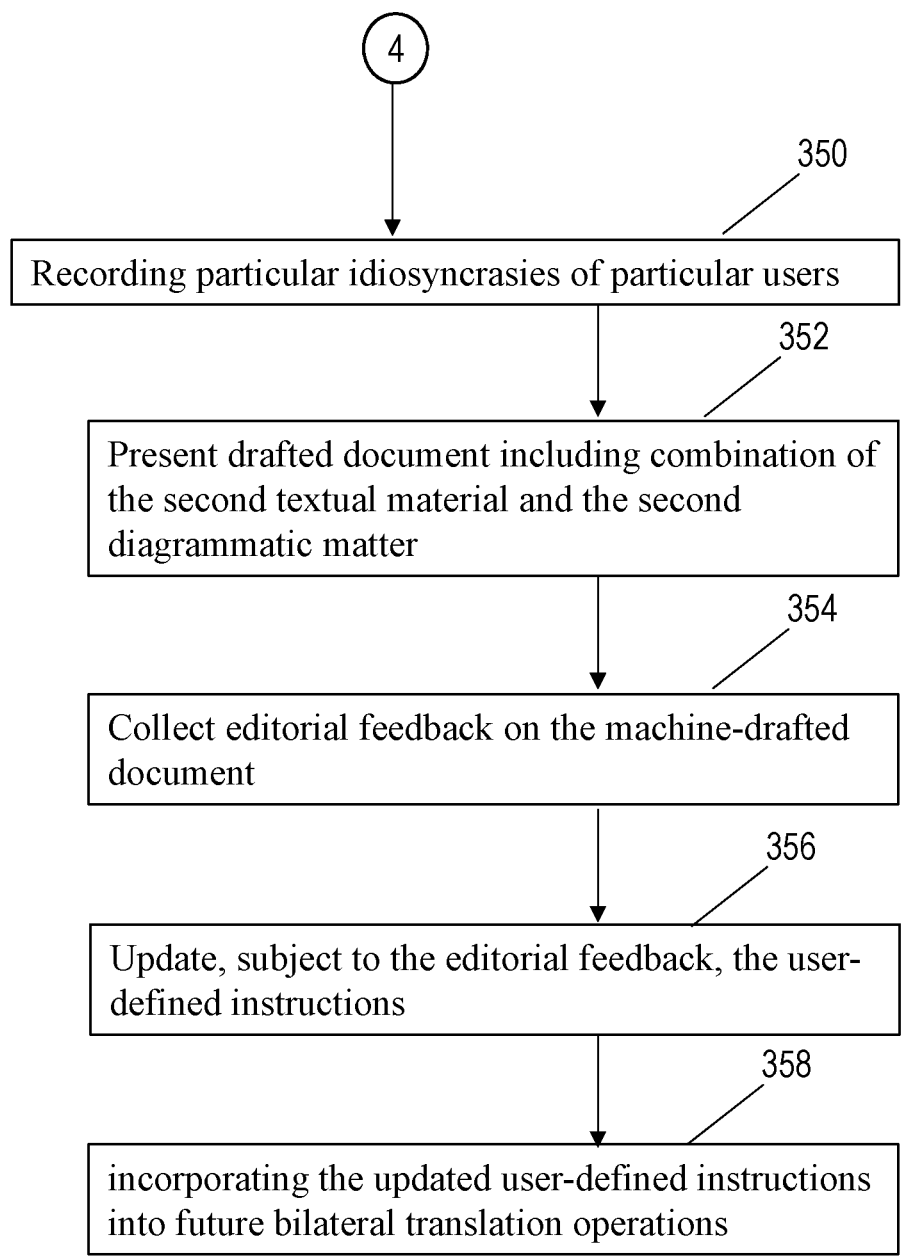
Figure 4:
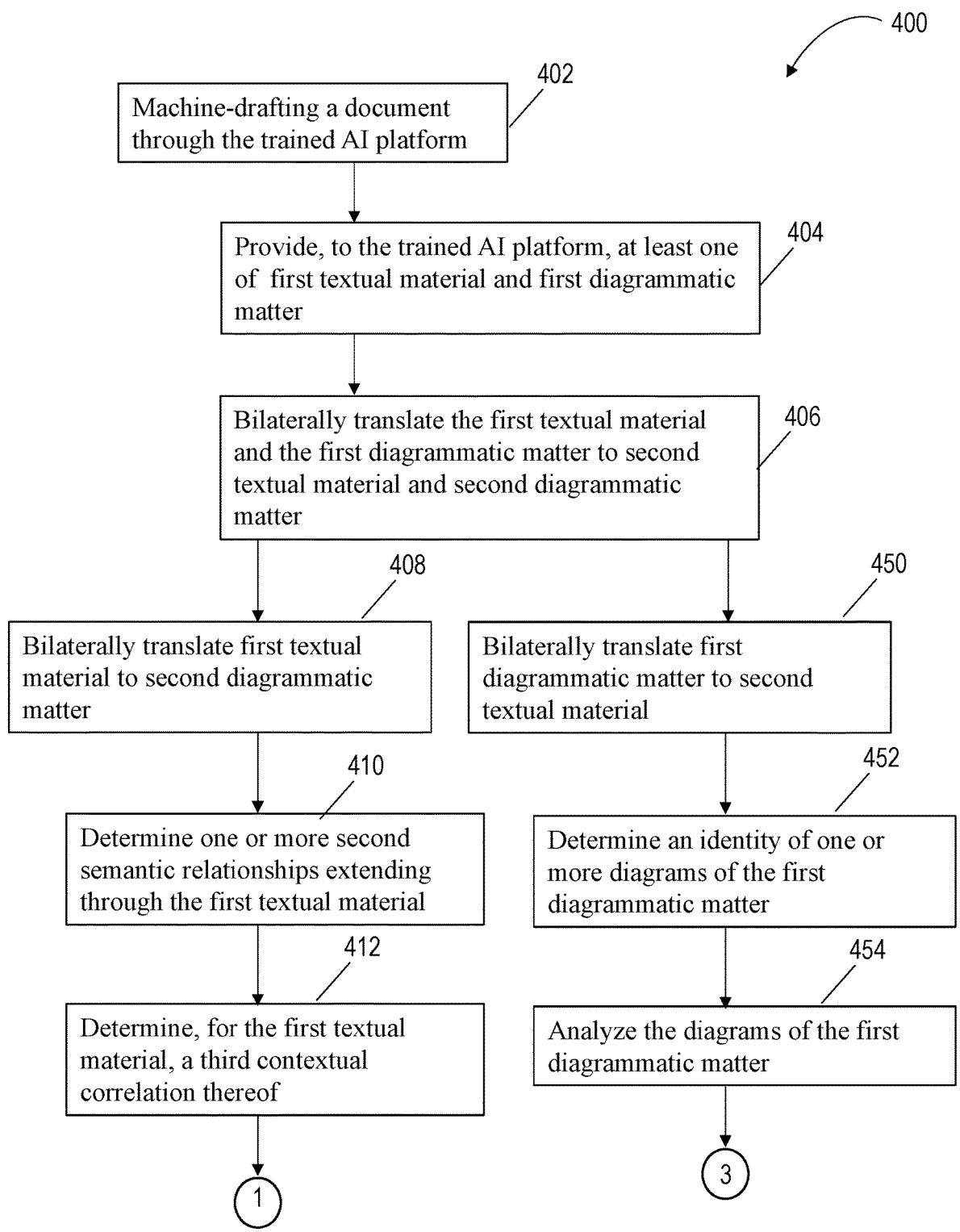
FIG. 4 is a flowchart of a process for employing an AI platform to execute bilateral contextual alignment of textual material and associated diagrammatic matter, in accordance with some embodiments of the present disclosure.
Figure 4:
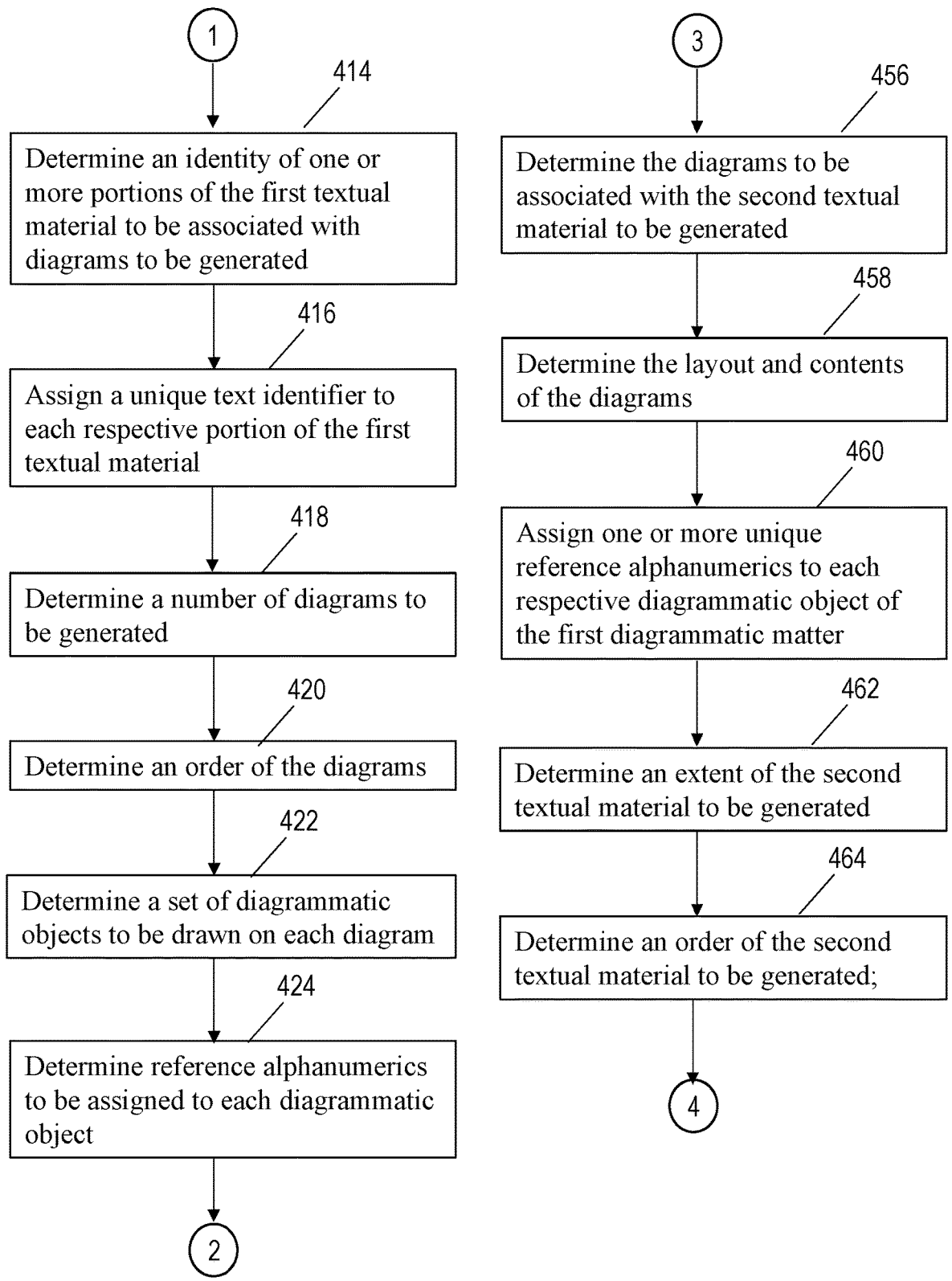
Figure 4:
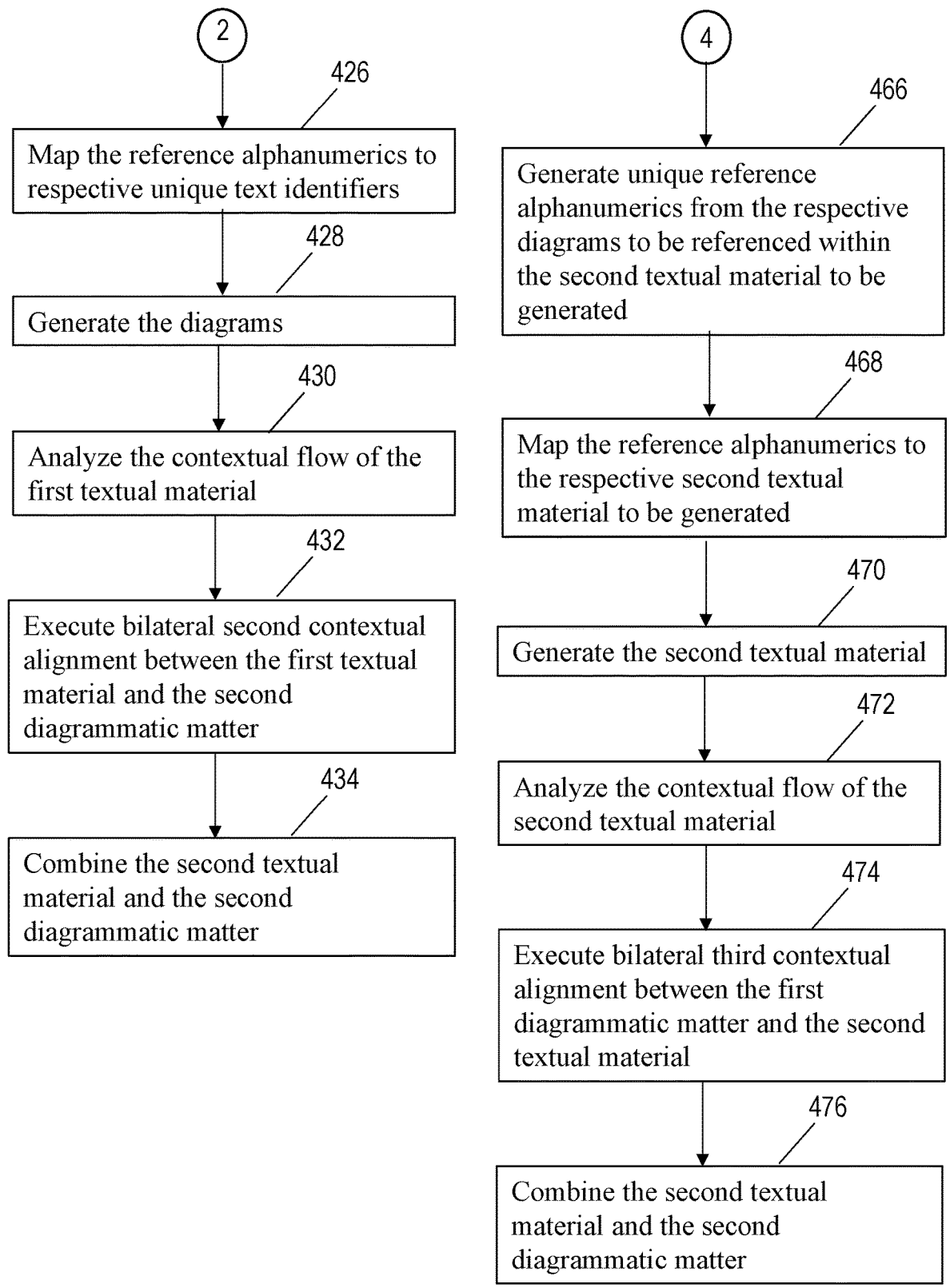

Referring to FIG. 3, and FIGS. 1 and 2, a flowchart is provided illustrating a process 300 for training 302 the AI platform 150 to execute bilateral contextual alignment of textual material and associated diagrammatic matter. In at least some embodiments, the process 300 includes building 304 the knowledge corpus 172, that employs data collection and curation 306 to facilitate ingestion, or intake of a plurality of third textual material and a third diagrammatic matter by the data manager 152. The sources for the third textual material and the third diagrammatic matter ingestion may include, without limitation, any source available through the computing devices 180-192 across the computer network connection 105, including images captured through a camera within the IoT devices 192. The third textual material and the third diagrammatic matter are used exclusively for training the AI platform 150 to ingest at least one of first textual material and first diagrammatic matter and execute a bilateral translation into at last one of second textual material and second diagrammatic matter. The third diagrammatic matter includes one or more of third pictorial objects and third diagrammatic textual matter. In at least some embodiments, the curation 306 of the third textual material and diagrammatic matter includes one or more volumes that have been collected historically. In some embodiments, the collection and curation 306 may be performed in response to the need to train 302 the AI platform 150 on a particular type of document that it has not yet been trained. Moreover, in some embodiments, training 302 the AI platform 150 may include curating 306 data associated with a particular technical subject, for example, and without limitation, computer science research and development and bridge construction projects. In general, data collection and curation 306 includes gathering and ingesting various documents having one or more diagrams and associated textual descriptions by the data manager 152. In some embodiments, practical examples of such documents include, without limitation, architectural documents, technical and research papers, patent applications, formal project bids, and project management Gantt charts. The textual material are stored in the textual material database 173 and the diagrammatic matter is stored in the diagrammatic matter database 174.

In some embodiments, the curation 306 of the third diagrammatic matter may include, without limitation, detailed assembly diagrams, exploded component diagrams, and one or more flowcharts directed toward assembly, routine operation, and maintenance. Some volumes of ingested material may include integrated textual material and diagrammatic matter and the data manager 152, NLP manager 154, and diagram manager 156 may cooperate to extract the textual material and the diagrammatic matter and separate for storage in the textual material database 173 and diagrammatic matter database 174 as appropriate.

In addition, in some embodiments, the curation 306 of data into the AI platform 150 includes determining 308, through the NLP features of the NLP manager 154, one or more first semantic relationships within the plurality of third textual material. For example, the third textual material of the wind turbine generator embodiment may include, without limitation, technical description manuals, original equipment manufacturers' (OEM) assembly and maintenance manuals, operating manuals, OEM troubleshooting manuals, and OEM web-based advisories. In particular, in some embodiments, the determination 308 of the first semantic relationships for the third textual material leads to determining 310 a first contextual correlation of the third textual material. Therefore, while the third textual material certainly vary in scope, a number of a contextual correlations between the texts will likely result due to the material being directed to a particular wind turbine generator and the substantial commonality of terms used therein, including terms of art. Accordingly, the NLP manager 154 analyzes the semantic flow of the textual content, and the semantic flow of the textual content indicates how the individual textual contents are contextually correlated, thereby establishing a better understanding of the textual content than would be achieved through examination of each reference in isolation.

In one or more embodiments, the curation 306 of data into the AI platform 150 includes labeling 312 by the diagram manager 156 each pictorial object of the third diagrammatic matter with reference alphanumerics and noun descriptors consistent with the respective third textual material. Specifically, during the curation 306 process, each and every diagram portion is labeled 312 individually based on the first contextual correlation determination 310 of the third textual material. In some embodiments, the labeling 312 is performed manually through supervised learning, and in some embodiments, the labeling 312 is performed automatically through previous labeling training of the AI platform 150, i.e., semi-supervised learning. Also, in some embodiments, at least a portion of the labeling is existing on the diagrams at intake. For example, in one embodiment of automated labeling one diagram curated 306 into the diagrammatic matter database 174 may include an illustration of wind turbine rotor windings and stator windings and installed instrumentation. Each illustrated component, i.e., pictorial object, will receive one or more reference alphanumerics and a brief noun description. For example, the stator windings may receive an alphanumeric of "1000" and "Stator Windings," the rotor windings may receive an alphanumeric of "2000" and "Rotor Windings," and the voltage measurement instrument of the stator windings may receive "1000-VI" and "Stator Voltage Measurement Instrument," etc. The alphanumerics and descriptors are generated and assigned by the drafting manager 158 and are applied to the diagrams through the diagram manager 156. Accordingly, since this labeling 312 is substantially based on the first contextual correlation of the third textual material, subsequent alignment of the text and diagrams, as discussed further herein, is facilitated.

In addition, in one or more embodiments, the AI platform 150, through analyzing the ingested third diagrammatic matter via at least a portion of the diagram analytics embedded within the diagram manager 156, can identify pictorial objects. In some embodiments, the pictorial objects may include, without limitation, any image icons, for example, and without limitation, readily available vehicle icons, wind turbine blades, and computing system icons such as those used in FIG. 1 of this description, that are embedded in the ingested diagrams. The diagram manager 156, through the embedded diagram analytics, will recognize 314 the objects regardless of which diagram they are resident. Therefore, as different versions and perspectives of the analyzed pictorial objects are ingested and used to train the AI platform 150, the diagram manager 156 will be further able to recognize the objects. In some embodiments, flowcharts and block diagrams will be analyzed similarly to facilitate mapping the accompanying textual description for each of the blocks as described further herein. In addition, in some embodiments, the respective reference alphanumerics assigned to the pictorial objects in the operation 312 are associated with each object such that the AI platform 150, and specifically, the diagram manager 156, and in some embodiments, the drafting manager 158, is trained 316 to recognize the reference alphanumerics. Accordingly, the AI platform 150 is trained to recognize 314 each third diagrammatic object, including each pictorial object, in the third diagrammatic matter as an independent artifact based on the labeling of the third pictorial objects and is further trained 316 to recognize the respective reference alphanumerics.

In at least some embodiments, upon training the AI platform 150 to recognize the assigned reference alphanumerics, upon completion of the cross-referencing between the textual material and diagrammatic matter through the reference alphanumeric assignments, the AI platform 150 analyzes the first pictorial objects and the first diagrammatic textual content within the third diagrammatic matter simultaneously while analyzing the respective first textual material through the respective reference alphanumerics. Specifically, the drafting manager 158 performs 318 a second contextual analysis of the first pictorial objects and the first diagrammatic textual content within the third diagrammatic matter simultaneously with analyzing the respective third textual material through the respective reference alphanumerics. Then, in some embodiments, the drafting manager 158 performs 320 a second contextual correlation through the third textual material and the third diagrammatic matter. The second contextual correlation differs from the first contextual correlation in that the first contextual correlation was restricted to the third textual material. The second contextual analysis and correlation identifies how different reference alphanumerics are annotated in the diagrams, and how the diagrams are correlated with the textual material. Accordingly, subject to the labeling with the respective reference alphanumerics, the second contextual correlation of the third textual material and the third diagrammatic matter facilitates a subsequent mapping thereof.

In at least some embodiments, the the building the knowledge corpus 304 to the AI platform 150 includes defining 322 one or more first mappings between respective portions of the plurality of third textual material and respective portions of the third diagrammatic matter. For example, in some embodiments, and without limitation, a textual description of the technical details of the design and construction of a wind turbine generator, one or more diagrams, and textual operating procedures, are curated 306 into the knowledge corpus 172. The diagrams may include diagrams illustrating the spectrum of depictions of the respective wind turbine generator from a single figure showing the major components to diagrams drilling down to more detailed illustrations, for example, and without limitation, details of installed instrumentation in the rotor and stator windings. Specifically, a first diagram may show a generator, a second diagram may show the rotor and stator windings, a third diagram may show the points of installation and wiring of the windings instrumentation, a text section may describe the generator, windings, and instrumentation in detail, and the procedures may describe how to calibrate the instrumentation. The textual material including the descriptions and procedures may be mapped to each by the NLP manager 154, thereby facilitating a more complete mapping of the third textual material and the third diagrammatic matter. Accordingly, the curation 306 process results in a first mapping of the plurality of third textual material and the third diagrammatic matter, where the mapping facilitates an alignment (discussed further herein) of the technical subject matter between the descriptions, diagrams, and procedures as discussed with respect to the respective wind turbine generator embodiment.

In addition, in one or more embodiments, the NLP features embedded within the NLP manager 154, the diagram analytics features embedded within the diagram manager 156, and the one or more user profiles stored in the user definitions database 177, are employed for determining 324 first textual patterns extending through the third textual material and the third diagrammatic textual content resident within the third diagrammatic matter. The first textual patterns are partially based on the first mapping 322 of the plurality of third textual material and third diagrammatic matter. In the wind turbine generator embodiment, for example, such textual patterns will capture the contextual relationship between the wind turbine generator, the associated stator and rotor windings, and the installed winding instrumentation and the respective text and diagrams throughout the ingested manuals, diagrams, etc. as previously described. In some embodiments, the AI platform 150 attains a subject matter expert status of one or more subjects as a secondary result of the training 302 and curation 306 as described herein. In some embodiments, the automated curation 306 may be sufficient to determine 324 the desired textual patterns as a natural consequence of the analyses and operations described thus far. In some embodiments, some manual curation may be necessary to identify specific portions of the textual material and diagrammatic matter where specific mapping is desired. Accordingly, the various threads for each of the portions of subject matter extending through the third textual material and the third diagrammatic matter are mapped throughout to facilitate future contextual alignments.

Furthermore, in at least some embodiments, during the curation 306, portions of the third textual material are contextually aligned 326 with the respective portions of the third diagrammatic matter by the AI platform 150. Specifically, based on the first textual patterns determined between the third textual material and the third diagrammatic matter, the drafting manager 158 executes 326 a first contextual alignment of the third textual material and the third diagrammatic matter. In at least some embodiments, when the third textual material and the third diagrammatic matter are contextually aligned, the technical context between the third technical material and the third diagrammatic textual content are aligned in relation to each other. For example, and without limitation, a textual description of an electric motor within a technical document and any textual content within any associated diagrams will be contextually aligned with each other, while the same electric motor description within the technical document and any diagrammatic content directed to material not related to electric motors remains unaligned contextually. Accordingly, the first contextual alignment is executed through the third textual material and third diagrammatic matter to facilitate generating a model of contextually aligned subject matter that will be used for aligning future subject matter.

In one or more embodiments, as discussed herein, the data collection, curation, analysis, and correlation facilitates populating the knowledge corpus 172 with sufficient information to train the AI platform 150. In addition, the knowledge corpus 172 may also be populated 330 with collected and ingested standard instructions for automatically executing at least a portion of the associated activities. For example, the collection or populating 330 process includes, when the AI platform 150 is placed into production, ingesting 332 instructions for standardizing the analyzing of the first textual material and the first diagrammatic matter to generate the semantic relations, the associated correlations, and the subsequent alignments therebetween are employed. In addition, in some embodiments, the knowledge corpus 172 ingests 334 standard diagrammatic notations including the associated symbology and the meaning of different portions of the diagrams, for example, and without limitation, directional arrows and decision diamonds. For example, the populating 330 process includes, when the AI platform 150 is placed into production, ingesting 336 instructions for generating the second textual material and the second diagrammatic matter from the first textual material and the first diagrammatic matter. Accordingly, the AI platform 150 includes sufficient instructions for executing the operations as described herein, where the instructions are stored within the standard instructions database 175.

Furthermore, in one or more embodiments, the building 304 of the knowledge corpus 172 includes collecting 340 non-standard instructions to be used in training the AI platform 150 to execute the activities as described herein. For example, such non-standard instructions may include user-defined instructions resident within one or more user profiles that are maintained in the knowledge corpus 172. Therefore, the building 304 of the knowledge corpus 172 includes ingesting 342 user-defined instructions that may be directed toward generating the second textual material and the second diagrammatic matter from the first textual material and first diagrammatic matter once the AI platform is placed into production. For example, in some embodiments, one or more particular users may prefer the term "capacitor" over the older term "condenser" when referring to electrical circuits. In such cases, for older ingested documents, the non-standard instructions will include instructions to convert the term "condenser" to "capacitor" when referring to capacitive devices and the standard schematic symbology in electrical circuit diagrams and the associated textual references.

In addition, in some embodiments, at least some of the non-standard instructions are recorded 350 by the AI platform 150 during production. The recorded 350 non-standard instructions may be directed to particular idiosyncrasies of particular users that are contained in the respective user profiles, or user definitions database 177, in the knowledge corpus 172. For example, a first draft of a machine-drafted document including the combination of second textual material and second diagrammatic matter may be presented 352, and the user's editorial feedback on the machine-drafted document is collected 354. The user-defined instructions are updated 356 subject to the editorial feedback, and the updated user-defined instructions are incorporated 358 into the into future bilateral translation operations. In at least some embodiments, the standard instructions and the non-standard instructions may be implemented during the training of the AI platform and the respective user profiles, or user definitions database 177, in the knowledge corpus 172. Accordingly, the AI platform 150 may be continuously trained for each particular user.

For example, in at least some embodiments, the various editorial changes or corrections are automatically tracked in the background to capture user preferences and are recorded as training feedback to the AI platform 150. Therefore, the AI platform is continuously trained as a function of the training feedback as a function of the user behaviors. In some embodiments, negative feedback such as stylistic changes or technical preferences is recorded and positive feedback such as no changes or document saves. These changes are stored in the respective user profiles, or user definitions database 177, and the training knowledge corpus 172 is updated.

Therefore, in one or more embodiments disclosed herein, the described performance of data collection, curation, analysis, and correlation of the third textual material and the third diagrammatic matter results in building the knowledge corpus 172 that is used to train the AI platform 150 to execute bilateral contextual alignment of textual material and associated diagrammatic matter. Specifically, the AI platform 150 is trained to bilaterally understand textual and diagrammatic patterns established by a user, and to learn to draft and edit such textual material and associated diagrammatic matter based on user behavior and preferences. Accordingly, the AI platforms 150 described herein are trained to recognize each first pictorial object in the first diagrammatic matter as an independent artifact based on the labeling of the first pictorial objects and is further trained to recognize the reference alphanumerics.

Referring to FIG. 4, and FIGS. 1-3, a flowchart of a process 400 is provided for employing the AI platform 150 to execute bilateral contextual alignment of textual material and associated diagrammatic matter through machine-drafting 402 a document through the trainer AI platform 150. In at least some embodiments, upon completion of the training processes, the AI platform 150 described herein include features and capabilities to identify patterns that correlate textual material and diagrammatic matter. For example, in response to the ingestion of post-training first textual material and first diagrammatic matter, the AI platform 150 will determine those portions of the diagram that need detailed descriptions and generate those descriptions. In addition, the AI platform 150 will analyze how the textual description is written for a specific diagram section, including, without limitation, how arrow directions describe the contextual flow of the content. Furthermore, the training of the AI platform 150 described herein provide the AI platform 150 with the features to determine those portions of the diagrams that need unique reference alphanumerics and will generate the reference alphanumerics and add to the diagrams and respective textual descriptions. Accordingly, the AI platforms described herein are configured to complete text and diagrams that are only partially drafted.

Further, in some embodiments, as part of the AI platform 150 training process, the AI platform 150 learns to determine, for any textual content that is written, if a diagram needs to be generated to complement the textual content. For such diagrams, the AI platform 150 is trained to identify specific keywords from the textual documents, such as, and without limitation, the particular subject of the textual content, the source of the textual material, and previous processing of similar material. The AI platform 150 is also trained to determine correlations through the identified keywords, including, without limitation, interactions between the subjects associated with the keywords, and how those actions are performed. Furthermore, the AI platform 150 is trained to determine decision-making steps and the conditions that are used to make the appropriate decisions. Accordingly, the AI platform 150 described herein is trained and configured to determine, draft, and provide diagrammatic content to accompany respective textual content.

Upon completion of the training process 302, the trained AI platform 150 is configured to machine-draft 402 documents that include textual material and diagrammatic matter. The trained AI platform 150 is provided one or more of a first textual material and a first diagrammatic matter including one or more of first pictorial objects and first diagrammatic textual matter. In some embodiments, either the first textual material or the first diagrammatic matter may be provided singly. In some embodiments, both the textual material and the first diagrammatic matter are provided, however, either one is known to be incomplete. In some embodiments, both the textual material and the first diagrammatic matter provided are deemed to be complete, and are submitted to the AI platform 150 to determine the adequacy of the submissions.

As previously discussed herein, the first textual material and the first diagrammatic matter are provided 404 as an input to the AI platform 150 through the data manager 152 once the trained AI platform 150 is placed into production. The sources for the first textual material and the first diagrammatic matter ingestion may include, without limitation, any source available through the computing devices 180-192 across the computer network connection 105, including images captured through a camera within the IoT devices 192. The second textual material and the second diagrammatic matter, once produced as described herein, are directed toward the output of the AI platform 150 once placed into production, for example, and without limitation, visual display 130 and the computing devices 180-192 across the computer network connection 105. As described with reference to FIG. 3, the third textual material and the third diagrammatic matter are directed to the training of the AI platform 150 prior to being placed into production.

The trained AI platform 150 bilaterally translates 406, through the NLP features of the NLP manager 154, the diagram analytics features of the diagram manager 156, and the one or more user profiles, the first textual material and the first diagrammatic matter, including first pictorial objects and first diagrammatic text, to second textual material and second diagrammatic matter, including second pictorial objects and second diagrammatic text. Upon successful translation, the second textual material and the second diagrammatic matter are aligned to define a substantially seamless product.

Specifically, in some embodiments, the bilateral translation 406 is executed through the trained AI platform 150 that is configured to receive the first textual material through the provide 404 operation, with or without first diagrammatic matter, and generate second diagrammatic matter based on a contextual alignment with the first textual material, as discussed further herein. In addition, the trained AI platform 150 may modify the first textual material to accommodate the generation of the second diagrammatic matter, thereby generating second textual material through a bilateral contextual alignment, also discussed further herein. Similarly, the trained AI platform 150 is configured to receive first diagrammatic matter with or without first textual material through the provide 404 operation, and generate second textual material based on a contextual alignment with the first diagrammatic matter. In addition, the trained AI platform 150 may modify the first diagrammatic matter to accommodate the generation of the second textual material, thereby generating second diagrammatic matter through a bilateral contextual alignment.

In one or more embodiments, to enable a first textual material-to-second diagrammatic matter bilateral translation 408, the AI platform 150 is configured to determine 410, through the NLP features of the NLP manager 154, one or more second semantic relationships extending through the first textual material. In addition, NLP manager 154 is configured to determine 412, subject to the second semantic relationships determination 410, for the first textual material, a third contextual correlation thereof. The second semantic relationships and the third contextual correlations for the first textual material are similar in nature to the first semantic relationships and first contextual correlations for the third textual material, both discussed with reference to FIG. 3 and operations 308 and 310, respectively. Accordingly, as was done for the training 302 of the AI platform 150 with the third textual material, the AI platform 150 ingests the first textual material and determines 410 the second semantic relationships and determines 412 the third contextual correlations.

In some embodiments, the drafting manager 158 determines 414, subject to the third contextual correlation determination 412, an identity of one or more portions of the first textual material to be associated with one or more diagrams to be generated for at least a portion of the second diagrammatic matter. In at least some embodiments, first diagrammatic matter may also be ingested with the first textual material and may eventually be included with the second diagrammatic matter. The drafting manager 158 assigns 416, subject to the identity determination 414, a unique text identifier to each respective portion of the first textual material, thereby at least partially generating the second textual material. As discussed further herein, the respective unique text identifiers assigned 416 to the text are used to facilitate generating the respective diagrams. From the text identifiers, the diagram manager 156 determines 418 a total number of diagrams to be included in the second diagrammatic matter. For example, and without limitation, in some embodiments while translating any textual content into a flowchart diagram, the proposed system diagram manager 156 determines 418 if multiple flowcharts or a single flowchart are needed. The number of flowcharts will be determined based on factors that include, without limitation, the complexity of the textual information, the volume and extent of the textual information, the user's level of understanding of the content, etc. These factors can be extended for diagrams that are, for example, schematic diagrams.

Subject to determining 418 the number of the diagrams to be generated, the diagram manager 156 determines 420 the order, or sequence, in which the diagrams will be placed. In addition, subject to the order determination operation 420, the diagram manager 156 determines 422 a set of diagrammatic objects to be drawn on each diagram. For those embodiments that include flowcharts, the diagram manager 156 determines a total number of flowchart blocks to be generated, the textual content to be added to each flowchart block, the type of flowchart icon to be used, a number of the flowcharts to be generated, and the order of the flowcharts.

In one or more embodiments, the drafting manager 158 determines 424, subject to the diagrammatic objects determinations 422, one or more reference alphanumerics to be assigned to each diagrammatic object, including if appropriate, flowchart blocks. The drafting manager 158 then maps 426 the respective reference alphanumerics to the respective unique text identifiers. Then the diagram manager 156 generates 428 the diagrams through the mapping 416 of the respective reference alphanumerics to the respective unique text identifiers. As the second diagrammatic matter is generated 428, the drafting manager 158 analyzes 430 the contextual flow of the first textual material, and if at least partially generated, the second textual material. Once the contextual flow analyses 430 are completed, the drafting manager 158 executes 432 a bilateral second contextual alignment between the first textual material and the second diagrammatic matter, thereby at least partially generating the second textual material.

Therefore, the AI platform combines 434 the second textual material and the second diagrammatic matter, where the second textual material and the second diagrammatic matter are contextually aligned. The second diagrammatic matter includes the pictorial objects, the flowchart blocks, and the respective reference alphanumerics such that one or more complete diagrams are generated that substantially match the respective text in the second textual material. The second textual material provides the associated descriptions of the pictorial objects through the mapping facilitated by the respective unique text identifiers, where the respective reference alphanumerics are now also resident within second textual material. Accordingly, the first textual material, and in some cases, the first diagrammatic matter, are bilaterally translated into the second textual material and the second diagrammatic matter that share a contextual alignment.

Similarly, in one or more embodiments, to enable the first diagrammatic matter-to-second textual material bilateral translation 450, the diagram manager 156 is configured to determine 452 the identity of the one or more diagrams within the first diagrammatic matter, regardless of whether the diagrams are substantially complete or not. Also, the diagram manager 156 analyzes 454, subject to the identification determination 452, the one or more diagrams of the first diagrammatic matter. Subject to the results of the analysis, the diagram manager 156 determines 456 the portions of the one or more diagrams to be associated with second textual material that is to be generated. In some embodiments, first textual material may also be ingested with the first diagrammatic matter and may eventually be included with the second textual material. In addition, the diagram manager 156 is configured to leverage the analysis 454 to determine 458 the layout and contents of each of the diagrams analyzed, including, determining, without limitation, the number and nature of the pictorial objects, the type of flowchart items, the relative positions thereof, any connection lines and arrows therebetween, and any existing diagrammatic text and markings.

Also, in some embodiments, the drafting manager 158 is configured to assign 460, subject to the association determination 456, one or more unique reference alphanumerics to each respective diagrammatic object of the second diagrammatic matter, thereby at least partially generating the second diagrammatic matter. The assigned unique reference alphanumerics facilitate the pending contextual alignment between the diagrammatic objects and the pending text to be generated. Also, subject to the association determination 456, an extent of the second textual material to be generated is determined 462 by the NLP manager 154 based on the scope and extent of the first diagrammatic matter. In addition, the NLP manager 154 is configured to determine 464 the order of the second textual material to be generated. Furthermore, the drafting manager 158 is configured to generate 466 the one or more unique reference alphanumerics, from the respective one or more diagrams that are to be referenced, within the second textual material as it is generated. The drafting manager 158 is also configured to map 468 the one or more reference alphanumerics to the respective second textual material as it is generated. The drafting manager 158 is further configured to generate 470 the second textual material accordingly. As the drafting manager 158 generates 470 the text through the mapping 468 of the respective reference alphanumerics to the respective to the respective second textual material, the drafting manager 158 analyzes 472 the contextual flow of the second textual material, and if at least partially generated, the second diagrammatic matter. Once the contextual flow analyses 472 are completed, the drafting manager 158 executes 474 a bilateral third contextual alignment between the first diagrammatic matter and the second textual material, thereby at least partially generating the second textual material.

Therefore, the AI platform combines 476 the second textual material and the second diagrammatic matter, where the second textual material and the second diagrammatic matter are contextually aligned. The second textual matter includes the text and the respective reference alphanumerics from the one or more complete diagrams that define the second diagrammatic matter. The second textual material provides the associated descriptions of the pictorial objects through the mapping facilitated by the respective reference alphanumerics that are now also resident within the second diagrammatic matter. Accordingly, the first diagrammatic matter, and in some cases, the first textual material, are bilaterally translated into the second textual material and the second diagrammatic matter that share a contextual alignment.

In at least some embodiments, the AI platform is configured to continue the training and learning process after it has been placed into production and is bilaterally generating the contextually aligned second textual material and the second diagrammatic matter. In some embodiments, a user executes first changes to one of the second textual material and the second diagrammatic matter. The changes may be executed to correct an error in the generation of the second textual material and the second diagrammatic matter or to implement revisions to the text and diagrams. The AI platform is configured to determine, subject to the executed changes, one or more discrepancies between the second textual material and the second diagrammatic matter resulting from the executed changes. The discrepancies at least partially impact a synchronization of the contextual alignment between second textual material and the second diagrammatic matter.

In addition, in light of the discrepancy determination, the AI platform is configured to determine one or more locations within the second textual material and the second diagrammatic matter where the lack of synchronization is present between the second textual material and the second diagrammatic matter. The AI platform is configured to execute second changes to either, or both, the second textual material and the second diagrammatic matter to remove the one or more discrepancies and obtain, or restore synchronization therebetween. In the event that the editing of the second textual material or the second diagrammatic matter is to correct errors introduced during the generation thereof, the AI platform is configured to determine that the first changes and the second changes are training feedback, update the knowledge corpus with the first changes and the second changes, and update the training of the AI platform with the updated knowledge corpus. Similarly, if the editing of the second textual material or the second diagrammatic matter is to implement revisions to the text and diagrams, the training and learning features of the AI platform may still be used to provide the AI platform with additional drafting knowledge. Accordingly, the AI platforms as described herein are configured to continually train themselves through continued production.

Figure 5:
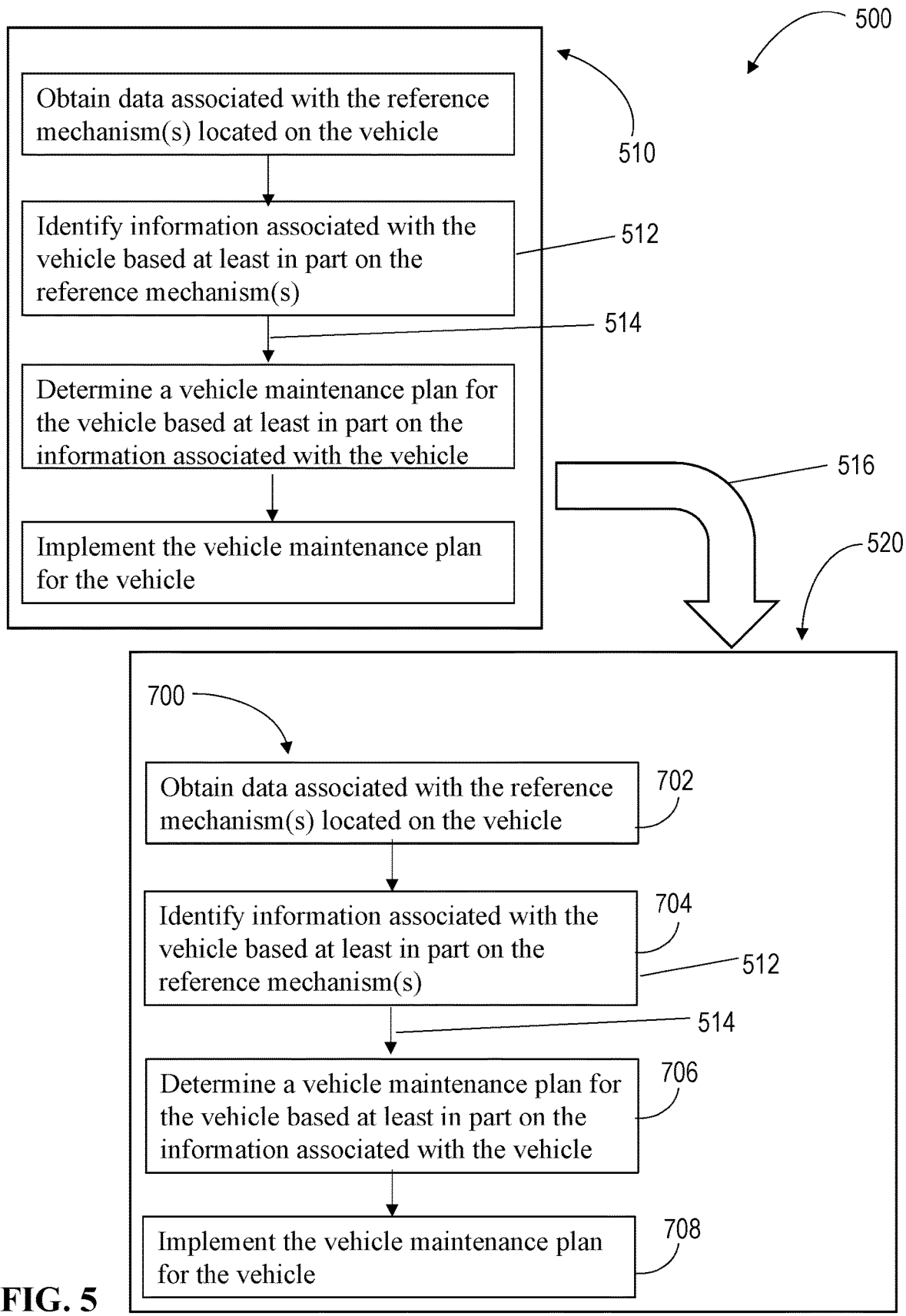
FIG. 5 is a schematic diagram illustrating a translation of first diagrammatic matter to second diagrammatic matter, in accordance with some embodiments of the present disclosure.
Figure 6:
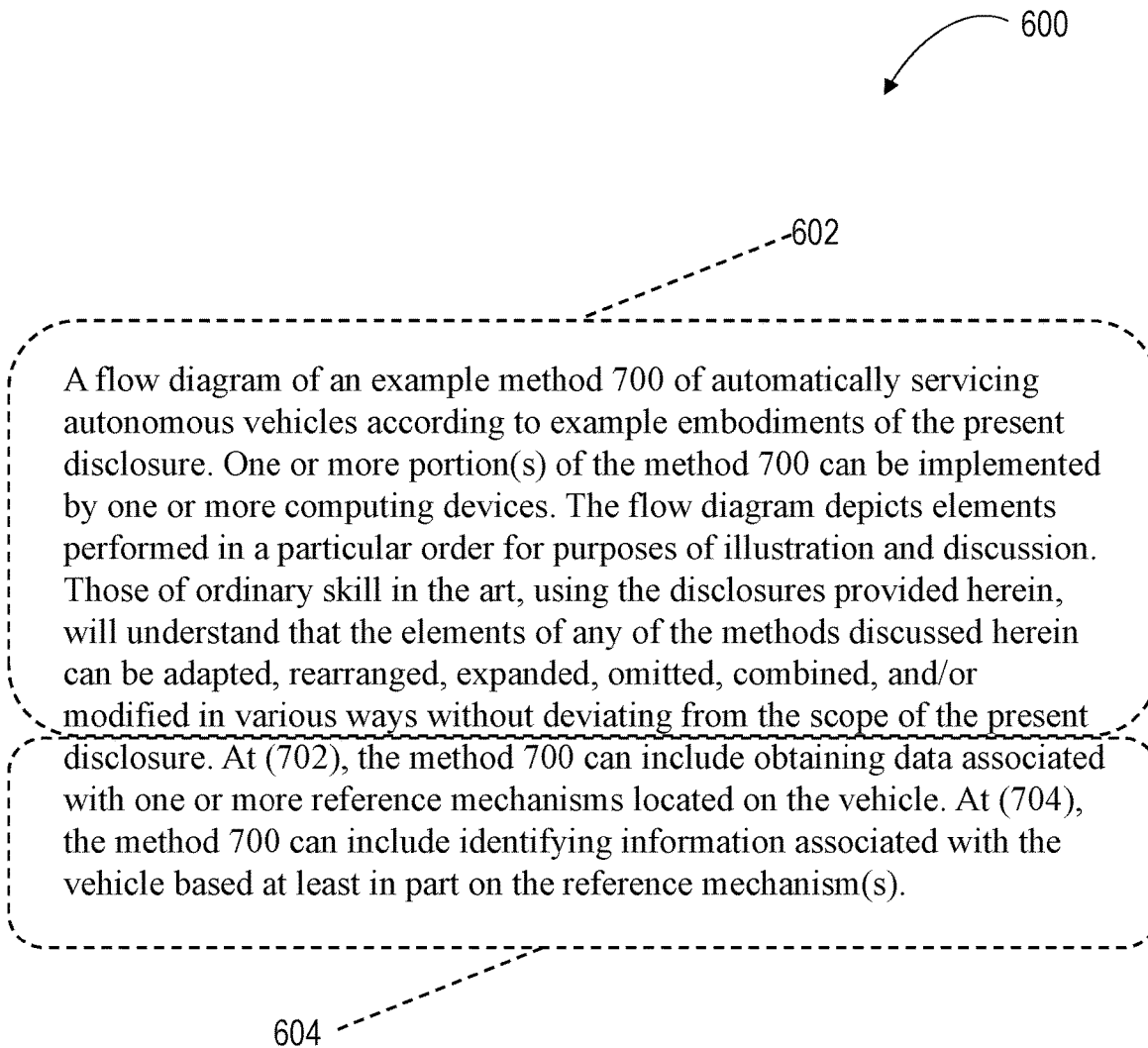
FIG. 6 is a schematic diagram illustrating a second textual material generated from the translation of the first diagrammatic matter to the second diagrammatic matter, in accordance with some embodiments of the present disclosure.

Referring to FIG. 5, a schematic diagram is provided illustrating a translation 500 of first diagrammatic matter to second diagrammatic matter. Also, referring to FIG. 6, a schematic diagram is provided illustrating a second textual material 600 generated from the translation of the first diagrammatic matter to second diagrammatic matter. The translation 500 includes a first diagrammatic matter 510 that represents a flowchart including a plurality of text blocks (e.g., block 512) connected by arrows (e.g., arrow 514). The first diagrammatic matter 510 is translated to second diagrammatic matter 520 as indicated by an arrow 516. The operations of FIG. 4 including operations 402 to 406 and operations 450 to 464 are executed. The, generation operation 466 is executed and the respective alphanumerics of "700," "702," "704," "706," and "708" are generated and added to the flowchart and each individual text block 512. The text is not modified. In some other embodiments, the text is modified. The directional arrows 514 are not changes. In some embodiments, objects such as directional arrows are changed. The second textual material 600 in FIG. 6 is generated per operations 468-470 with respect to FIG. 4. The second textual material 600 includes a "boilerplate" portion 602 that is inserted from, in some embodiments, the standard instructions database 175. The second textual material 600 also includes an original draft portion 604 that is based directly on the second diagrammatic matter 520. Once the second textual material 600 is generated, the bilateral third contextual alignment is executed 474 and the second textual material 600 and the second diagrammatic matter 520 are combined 476.

Figure 7:
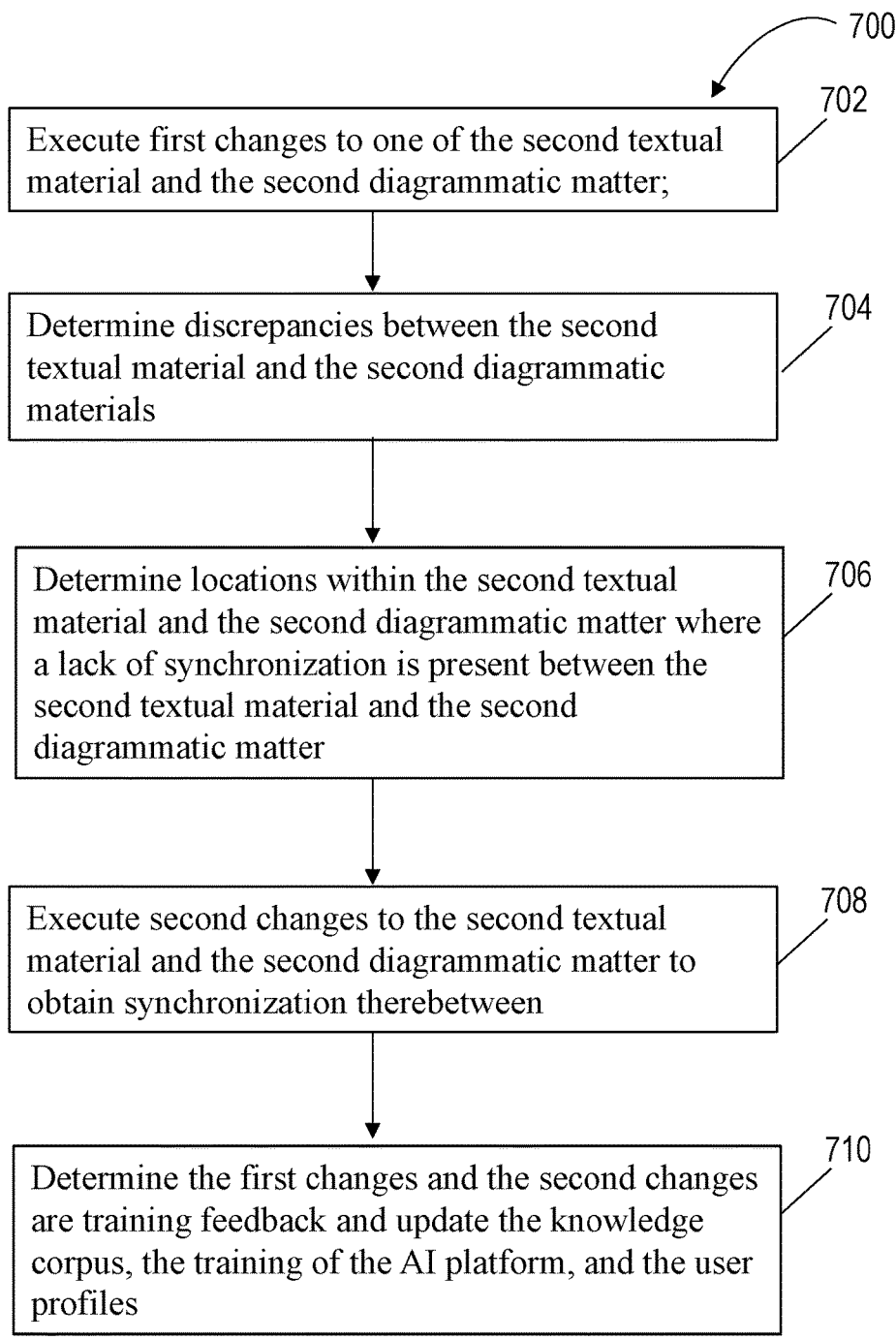
FIG. 7 is a flowchart of a process for editing the second textual material and the second diagrammatic matter through the AI platform after it is placed into production, in accordance with some embodiments of the present disclosure.

Referring to FIG. 7, a flowchart of a process 700 for editing the second textual material and the second diagrammatic matter through the AI platform after it is placed into production, in accordance with some embodiments of the present disclosure. In at least some embodiments, the AI platform 150 is configured to continue the training and learning process after it has been placed into production and is bilaterally generating the contextually aligned second textual material and the second diagrammatic matter as described herein. In some embodiments, a user executes 702 first changes to one of the second textual material and the second diagrammatic matter. In some embodiments, changes are made to both and in some embodiments the changes are only made to one of the two. The changes may be executed to correct an error in the generation of the second textual material and the second diagrammatic matter or to implement revisions to the text and diagrams for any reason, including technical revisions. The AI platform 150 is configured to determine 704, subject to the executed changes, one or more discrepancies between the second textual material and the second diagrammatic matter resulting from the executed changes. The discrepancies at least partially impact a synchronization of the contextual alignment between the second textual material and the second diagrammatic matter, where the prior synchronization is due to the bilateral contextual alignment through generating the second textual material and the second diagrammatic matter.

In addition, in light of the discrepancy determination 704, the AI platform 150 is configured to determine 706 one or more locations within the second textual material and the second diagrammatic matter where the lack of synchronization is present between the second textual material and the second diagrammatic matter. The AI platform 150 is also configured to execute 708 second changes to either, or both, the second textual material and the second diagrammatic matter to remove the one or more discrepancies and obtain, or restore synchronization therebetween. In the event that the editing of the second textual material or the second diagrammatic matter is to correct errors introduced during the generation thereof, the AI platform 150 is configured to determine 710 that the first changes and the second changes are training feedback, update the knowledge corpus with the first changes and the second changes, and update the training of the AI platform with the updated knowledge corpus. Similarly, if the editing of the second textual material or the second diagrammatic matter is to implement revisions to the text and diagrams, the training and learning features of the AI platform 150 may still be used to provide the AI platform 150 with addition drafting knowledge. Accordingly, the AI platform 150 as described herein is configured to continually train itself through continued production.

The system, computer program product, and method as disclosed herein significantly reduce a potential for writing a text fragment misaligned with a diagram or vice versa, thereby preventing conditions including not fully completing either the text fragment or the diagram that may result in a misalignment between the text and diagram. Many of the embodiments described herein reduce the reliance on the author exercising a substantial level of care and manual effort while writing text aligned with diagram, or vice versa. The system, computer program product, and method include a learning-based mechanism that can create formal structures of the text by analyzing the diagram and highlight the textual section that is not aligned with the diagram, and at the same time, it can also analyze the textual content to generate diagrams correctly aligned with the textual content.

Therefore, the embodiments disclosed herein provide an improvement to computer technology. For example, the automated bilateral contextual alignments described herein between textual material and diagrammatic matter enable automated synchronization between the two such that a reader will view a substantially seamless presentation. The continued training aspects of the AI platform 150 described herein enable continued updating and improvement of the abilities of the AI platform 150 in drafting documents. In addition, the ingestion of user requirements and idiosyncrasies automatically further facilitates the continued learning process. The bi-directional translation of textual material and diagrammatic matter is at least partially based on a combination of training the model or models through supervised or semi-supervised learning methodologies prior to, and after the models being placed into production.

Accordingly, the improvement to computer technology is manifested in a practical technical application of the methods described herein to train models to draft documents through bilateral contextual alignment to provide a synchronization of the contents automatically in lieu of known labor- and time-intensive and error-prone manual methodologies.

Figure 8:
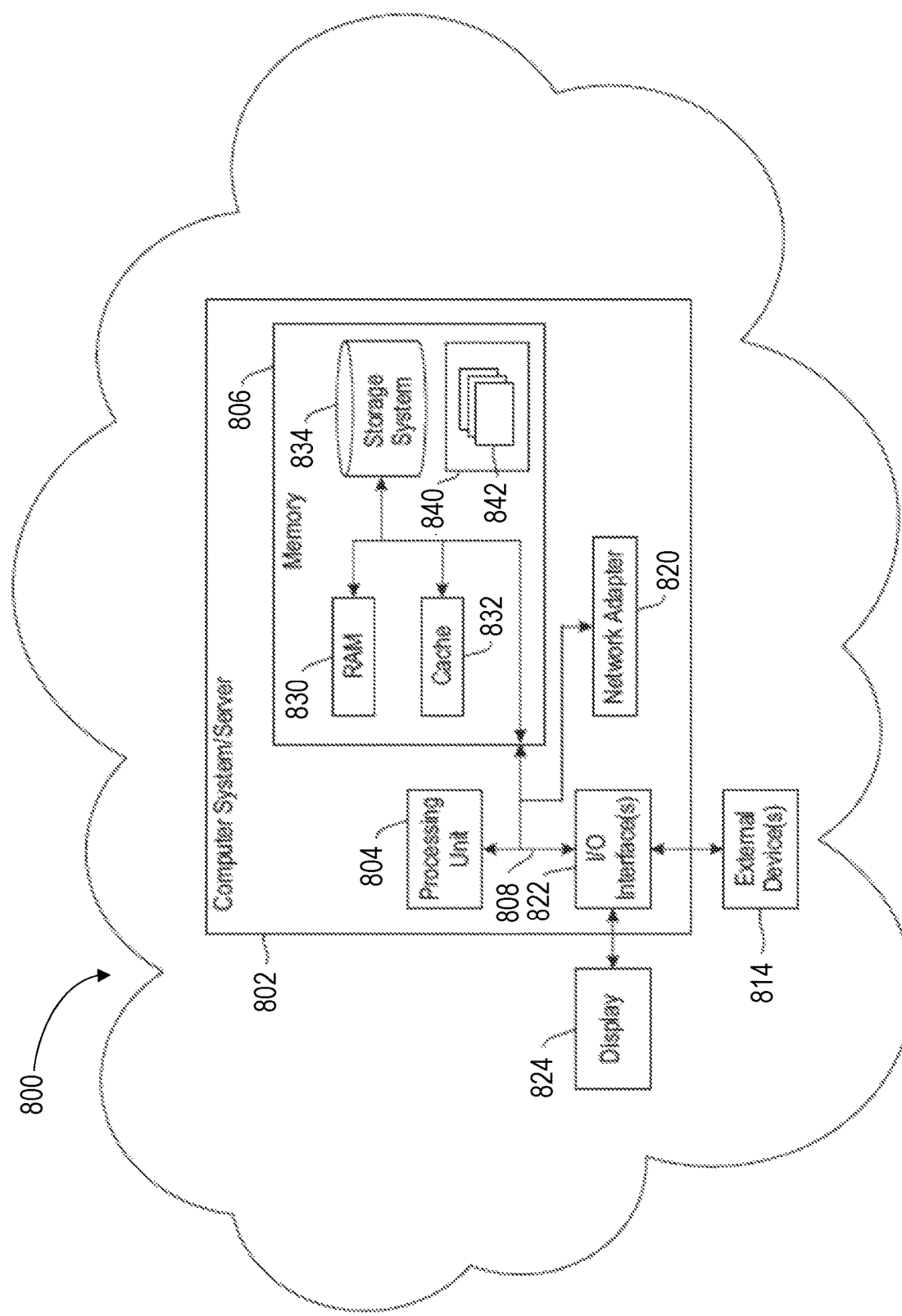
FIG. 8 is a block diagram illustrating a computer system/ server of a cloud-based support system, to implement the processes described above with respect to FIGS. 1-7, in accordance with some embodiments of the present disclosure.

Aspects of the computer system 100 (FIG. 1), i.e., contextual diagram-text alignment system 100 may be embodied in a computer system/server in a single location, or in at least one embodiment, may be configured in a cloud-based system sharing computing resources. With reference to FIG. 8, a block diagram is provided illustrating an example of a computer system 800 including a computer system/server 802, hereinafter referred to as a host 802 in communication with a cloud-based support system, to implement the system, tools, and processes described above with respect to FIGS.

1-7. Host 802 is operational with numerous other general purpose or special purpose computer system environments or configurations. Examples of well-known computer systems, environments, and/or configurations that may be suitable for use with host 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 802 may be described in the general context of computer system-executable instructions, such as program modules, being executed by a computer system. Generally, program modules may include routines, programs, objects, components, logic, data structures, and so on that perform particular tasks or implement particular abstract data types. Host 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, host 802 is shown in the form of a general-purpose computing device. The components of host 802 may include, but are not limited to, one or more processors or processing devices or units 804, e.g., hardware processors, a system memory 806, and a bus 808 that couples various system components including system memory 806 to processing device 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 802 typically includes a variety of computer system readable media. Such media may be any available media that is accessible by host 802 and it includes both volatile and non-volatile media, removable and non-removable media.

Memory 806 can include computer system readable media in the form of volatile memory, such as random access memory (RAM) 830 and/or cache memory 832. By way of example only, a storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces.

Program/utility 840, having a set (at least one) of program modules 842, may be stored in memory 806 by way of example, and not limitation, as well as an operating system, one or more application programs, other program modules, and program data. Each of the operating systems, one or more application programs, other program modules, and program data or some combination thereof, may include an implementation of a networking environment. Program modules 842 generally carry out the functions and/or methodologies of embodiments as described in FIGS. 1-7.

Host 802 may also communicate with one or more external devices 814, such as a keyboard, a pointing device, etc.; a display 824; one or more devices that enable a user to interact with host 802; and/or any devices (e.g., network card, modem, etc.) that enable host 802 to communicate with one or more other computing devices. Such communication can occur via Input/Output (I/O) interface(s) 822. Still yet, host 802 can communicate with one or more networks such as a local area network (LAN), a general wide area network (WAN), and/or a public network (e.g., the Internet) via network adapter 820. As depicted, network adapter 820 communicates with the other components of host 802 via bus 808. In at least one embodiment, a plurality of nodes of a distributed file system (not shown) is in communication with the host 802 via the I/O interface 822 or via the network adapter 820. It should be understood that although not shown, other hardware and/or software components could be used in conjunction with host 802. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 806, including RAM 830, cache memory 832, and storage system 834, such as a removable storage drive and a hard disk installed in a hard disk drive.

Computer programs (also called computer control logic) are stored in memory 806. Computer programs may also be received via a communication interface, such as network adapter 820. Such computer programs, when run, enable the computer system to perform the features of the present embodiments as discussed herein. In particular, the computer programs, when run, enable the processing device 804 to perform the features of the computer system 800. As such, computer programs may represent controllers of the computer system 800.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In at least one embodiment, host 802 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a state of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
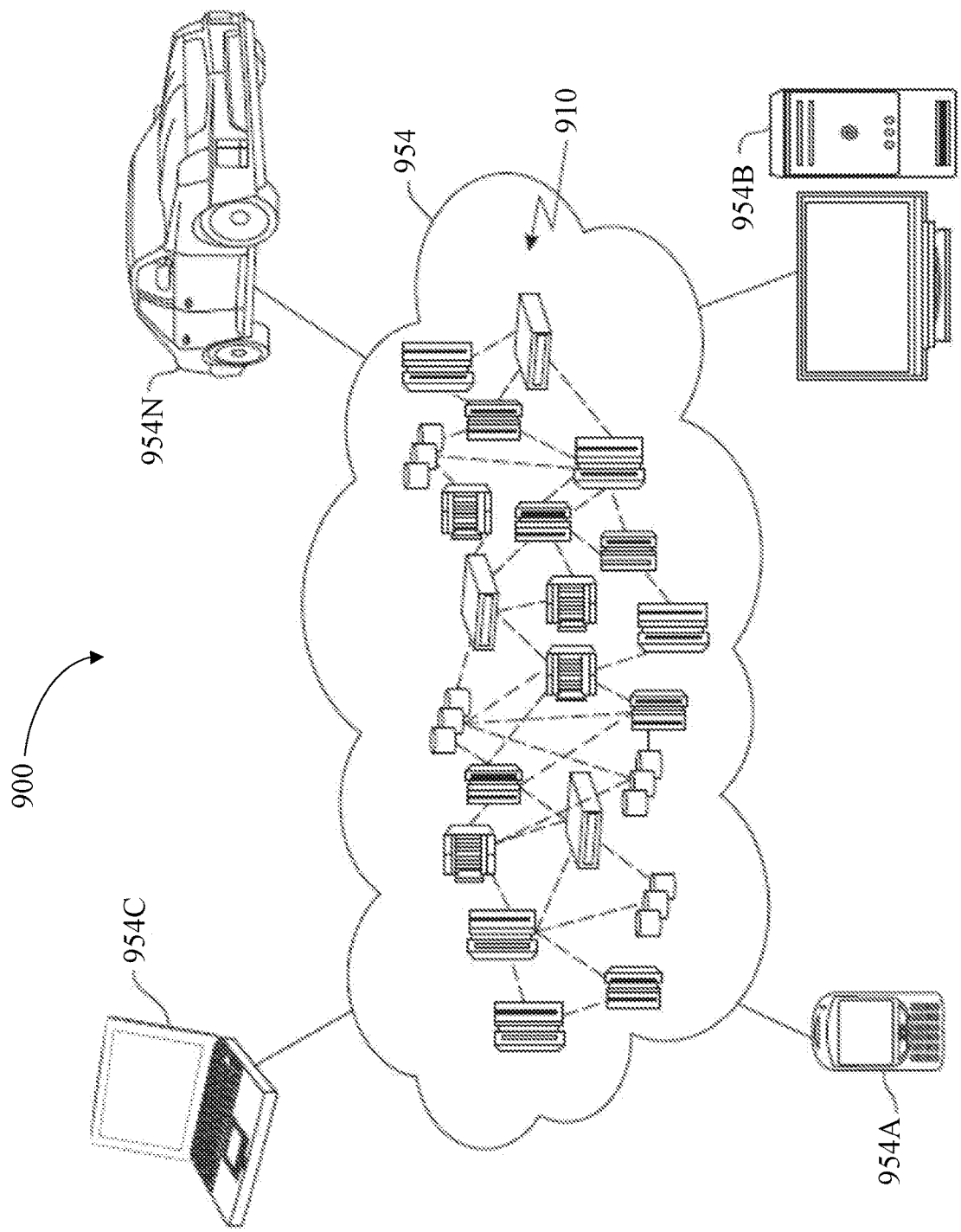
FIG. 9 is a schematic diagram illustrating a cloud computer environment, in accordance with some embodiments of the present disclosure.

Referring now to FIG. 9, a schematic diagram is provided illustrating an example cloud computing network 900. As shown, cloud computing network 900 includes a cloud computing environment 954 having one or more cloud computing nodes 910 with which local computing devices used by cloud consumers may communicate. Examples of these local computing devices include, but are not limited to, personal digital assistant (PDA) or cellular telephone 954A, desktop computer 954B, laptop computer 954C, and/or automobile computer system 954N. Individual nodes within nodes 910 may further communicate with one another. They may be grouped (not shown) physically or virtually, in one or more networks, such as Private, Community, Public, or Hybrid clouds as described hereinabove, or a combination thereof. This allows the cloud computing network 900 to offer infrastructure, platforms and/or software as services for which a cloud consumer does not need to maintain resources on a local computing device. It is understood that the types of computing devices 954A-N shown in FIG. 9 are intended to be illustrative only and that the cloud computing environment 954 can communicate with any type of computerized device over any type of network and/or network addressable connection (e.g., using a web browser).

Figure 10:
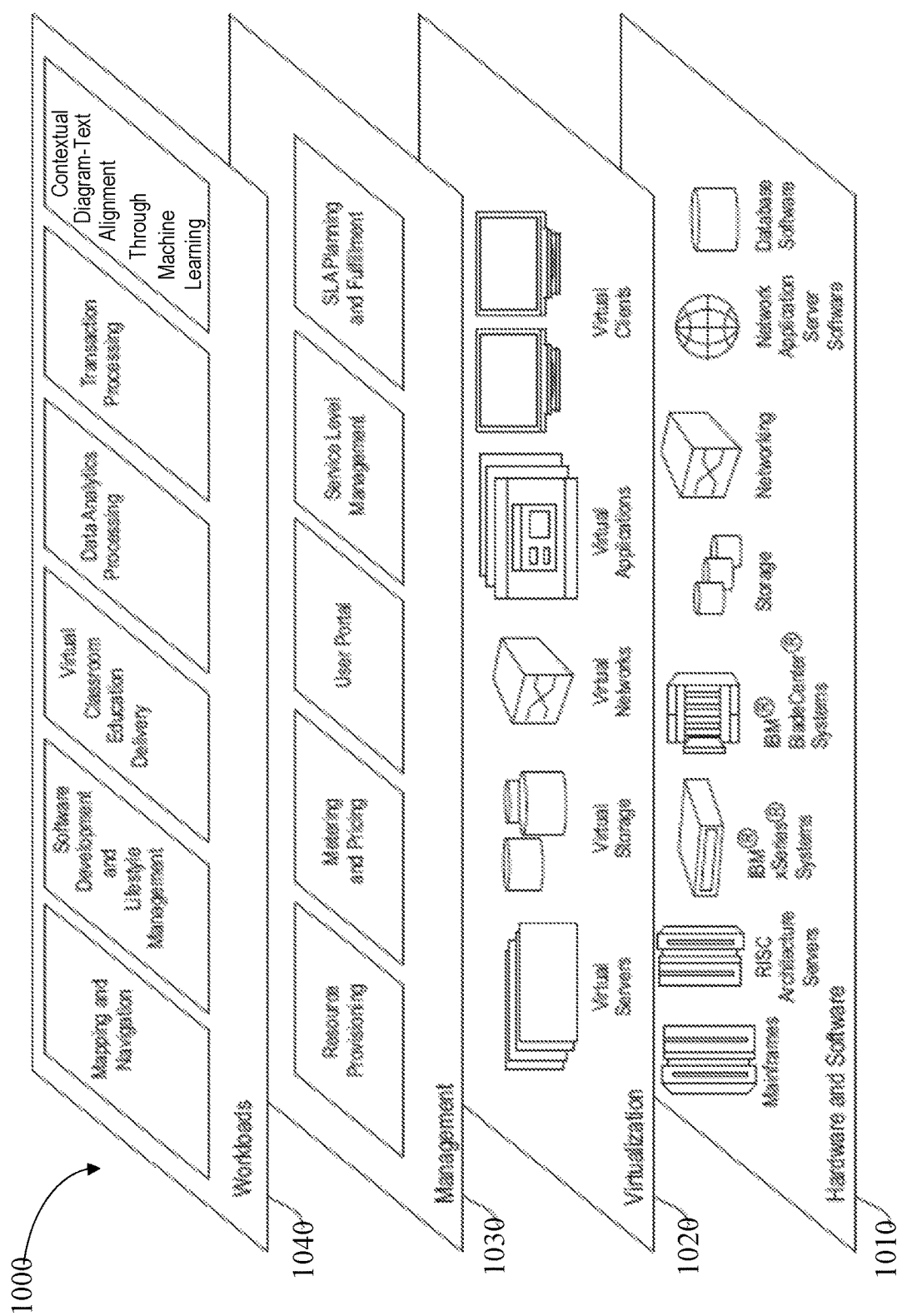
FIG. 10 is a block diagram illustrating a set of functional abstraction model layers provided by the cloud computing environment, in accordance with some embodiments of the present disclosure.

Referring now to FIG. 10, a set of functional abstraction layers 1000 provided by the cloud computing network of FIG. 10 is shown. It should be understood in advance that the components, layers, and functions shown in FIG. 10 are intended to be illustrative only, and the embodiments are not limited thereto. As depicted, the following layers and corresponding functions are provided: hardware and software layer 1010, virtualization layer 1020, management layer 1030, and workload layer 1040.

The hardware and software layer 1010 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 1020 provides an abstraction layer from which the following examples of virtual entities may be provided: virtual servers; virtual storage; virtual networks, including virtual private networks; virtual applications and operating systems; and virtual clients.

In one example, management layer 1030 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 1040 provides examples of functionality for which the cloud computing environment may be utilized. Examples of workloads and functions which may be provided from this layer include, but are not limited to: leveraging an artificial intelligence platform to enable bilateral contextual alignment of textual material and associated diagrammatic matter, and, more specifically, for leveraging a trained cognitive system to bilaterally understand textual and diagrammatic patterns established by a user, and to learn to draft and edit such textual material and associated diagrammatic matter based on user behavior and preferences.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
a server comprising at least one processing device and at least one memory device operably coupled to the at least one processing device, wherein the server includes natural language processing (NLP) features, diagram analytics features, and one or more user profiles; and
a knowledge base in operable communication with the server, the server configured to:
train an artificial intelligence (AI) platform to:
bilaterally translate between textual material and diagrammatic matter; and
machine-draft a document through the trained AI platform;
provide, to the trained AI platform, through the knowledge base, at least one of first textual material and first diagrammatic matter;
bilaterally translate, through the NLP features, the diagram analytics features, and the one or more user profiles, the at least one of the first textual material and the first diagrammatic matter to at least one of second textual material and a second diagrammatic matter, wherein the second diagrammatic matter is different from the first diagrammatic matter; and
combine the second textual material and the second diagrammatic matter, wherein the second textual material and the second diagrammatic matter are contextually aligned.

2. The system of claim 1, wherein the computer system is a cognitive system.

3. The system of claim 2, further comprising:
an AI platform resident within the server, the AI platform in operable communication with the knowledge base, the AI platform comprising:
a data manager configured to facilitate execution of one or more operations by the server comprising:
build a knowledge corpus including curation of an intake of third textual material and third diagrammatic matter;
a natural language processing (NLP) manager configured to facilitate, through at least a portion of the NLP features, execution of the one or more operations by the server comprising one or more of:
determine one or more first semantic relationships within the third textual material; and
determine, subject to the first semantic relationships, for the third textual material, a first contextual correlation thereof; and
a drafting manager configured to facilitate execution of one or more operations by the server comprising:
assign, subject to the first contextual correlation, one or more reference alphanumerics to each pictorial object within the third diagrammatic matter.

4. The system of claim 3, wherein:
the AI platform further comprises:
a diagram manager configured to facilitate, through at least a portion of the diagram analytics, execution of one or more operations by the server comprising one or more of:
label each pictorial object within the third diagrammatic matter with one or more of:
the reference alphanumerics; and
noun descriptors consistent with the respective third textual material;
train, subject to the labeling, the AI platform to recognize each pictorial object; and
train, subject to the pictorial object recognition, the AI platform to recognize the reference alphanumerics; and
the drafting manager is further configured to:
perform, subject to the reference alphanumerics recognition, a contextual analysis of the third textual matter and the third diagrammatic matter;
perform, subject to the contextual analysis, a second contextual correlation through the third textual material and the third diagrammatic matter;
define, subject to the second contextual correlation, one or more first mappings between the third textual material and the third diagrammatic matter;
determine, through the NLP features, first textual patterns extending through the third textual material and diagrammatic textual content resident within the third diagrammatic matter; and
execute, subject to the first textual patterns, a first contextual alignment of pictorial objects and reference alphanumerics with respective portions of the third textual material.

5. The system of claim 4, wherein the NLP manager is further configured to:

determine, through the NLP features, one or more second semantic relationships extending through the first textual material; and determine, through the NLP features, subject to the second semantic relationships determination, for the first textual material, a third contextual correlation thereof.

6. The system of claim 5, wherein:

the drafting manager is further configured to:
    determine, subject to the third contextual correlation, an identity of one or more portions of the first textual material to be associated with one or more diagrams to be generated, wherein the diagrams to be generated include at least a portion of the second diagrammatic matter; and
    assign, subject to the identity determination, a unique text identifier to each respective portion of the first textual material, thereby at least partially generating the second textual material;

the diagram manager is further configured to:
    determine, through the diagram analytics, subject to the identity determination, a number of the diagrams to be generated;
    determine, through the diagram analytics, subject to the number of diagrams determination, an order of the diagrams; and
    determine, through the diagram analytics, subject to the identity determination, a set of diagrammatic objects to be drawn on each diagram;

the drafting manager is further configured to:
    determine, subject to the diagrammatic objects determination, one or more reference alphanumerics to be assigned to each diagrammatic object; and
    define, subject to the reference alphanumerics determination, one or more second mappings between the one or more reference alphanumerics and respective unique text identifiers;

the diagram manager is further configured to:
    generate, subject to the one or more second mappings, the diagrams; and the drafting manager is further configured to:
    execute a bilateral second contextual alignment between the first textual material and the second diagrammatic matter, thereby at least partially further generating the second textual material.

7. The system of claim 4, wherein:

the diagram manager is further configured to:
    determine, through the diagram analytics, subject to the third contextual correlation, an identity of one or more diagrams of the first diagrammatic matter;
    analyze, through the diagram analytics, subject to the identity determination, the one or more diagrams of the first diagrammatic matter; and
    determine, through the diagram analytics, subject to the analysis, portions of the one or more diagrams to be associated with second textual material to be generated;

the drafting manager is further configured to:
    assign, subject to the association determination, one or more unique reference alphanumerics to each respective diagrammatic object of the second diagrammatic matter, thereby at least partially generating the second diagrammatic matter;

the NLP manager is further configured to:
    determine, subject to the association determination, an extent of the second textual material to be generated; and
    determine, subject to the extent determination, an order of the second textual material to be generated; and the drafting manager further configured to:
    generate, subject to the association determination, the one or more unique reference alphanumerics from the respective one or more diagrams to be referenced within the second textual material to be generated;
    define, subject to the reference alphanumerics generation, one or more third mappings between the one or more reference alphanumerics and the respective second textual material to be generated;
    generate the second textual material; and
    execute a bilateral third contextual alignment between the first diagrammatic matter and the second textual material, thereby at least partially generating the second diagrammatic matter.

8. The system of claim 4, wherein the drafting manager is further configured to:
execute first changes to one of the second textual material and the second diagrammatic matter;
determine, subject to the executed changes, one or more discrepancies between the second textual material and the second diagrammatic matter;
determine, subject to the discrepancy determination, one or more locations within the second textual material and the second diagrammatic matter where a lack of synchronization is present between the second textual material and the second diagrammatic matter; and
execute second changes to one of the second textual material and the second diagrammatic matter to obtain synchronization therebetween, thereby removing the one or more discrepancies.

9. A computer program product, comprising:
one or more computer readable storage media; and
program instructions collectively stored on the one or more computer storage media, the program instructions comprising:
    program instructions to train an artificial intelligence (AI) platform to:
        bilaterally translate between textual material and diagrammatic matter; and
        machine-draft a document through the trained AI platform;
    program instructions to provide, to the trained AI platform, at least one of a first textual material and a first diagrammatic matter;
    program instructions to bilaterally translate, through NLP features, diagram analytics features, and one or more user profiles, the at least one of the first textual material and the first diagrammatic matter to at least one of second textual material and second diagrammatic matter, wherein the second diagrammatic matter is different from the first diagrammatic matter; and
    program instructions to combine the second textual material and the second diagrammatic matter, wherein the second textual material and the second diagrammatic matter are contextually aligned.

10. A computer-implemented method comprising:
training an artificial intelligence (AI) platform to bilaterally translate between textual material and diagrammatic matter, wherein the AI platform includes natural language processing (NLP) features, diagram analytics features, and one or more user profiles; and
machine-drafting a document through the trained AI platform, the machine-drafting comprising:

providing, to the trained AI platform, at least one of first textual material and first diagrammatic matter;
bilaterally translating, through the NLP features, the diagram analytics features, and the one or more user profiles, the at least one of the first textual material and the first diagrammatic matter to at least one of second textual material and second diagrammatic matter, wherein the second diagrammatic matter is different from the first diagrammatic matter; and
combining the second textual material and the second diagrammatic matter, wherein the second textual material and the second diagrammatic matter are contextually aligned.

11. The method of claim 10, wherein training the AI platform comprises:
collecting standard instructions directed to:
analyzing the first textual material and the first diagrammatic matter; and
generating the second textual material and the second diagrammatic matter from the first textual material and the first diagrammatic matter; and
collecting non-standard instructions directed to generating the second textual material and the second diagrammatic matter from the first textual material and the first diagrammatic matter, wherein at least a portion of the non-standard instructions include user-defined instructions resident within the one or more user profiles.

12. The method of claim 11, wherein collecting the non-standard instructions comprises:
presenting the machine-drafted document including the combination of the second textual material and the second diagrammatic matter;
collecting editorial feedback on the machine-drafted document;
updating, subject to the editorial feedback, the user-defined instructions; and
incorporating the updated user-defined instructions into future bilateral translation operations.

13. The method of claim 10, wherein training the AI platform comprises:
building a knowledge corpus comprising curating an intake of third textual material and third diagrammatic matter;
determining one or more first semantic relationships within the third textual material;
determining, subject to the one or more first semantic relationships determination, for the third textual material, a first contextual correlation thereof; and
assigning, subject to the first correlation, one or more reference alphanumerics to each pictorial object within the third diagrammatic matter.

14. The method of claim 13, wherein training the AI platform further comprises:
labeling each pictorial object within the third diagrammatic matter with one or more of:
the reference alphanumerics; and
noun descriptors consistent with the respective third textual material;
training, subject to the labeling, the AI platform to recognize each pictorial object in the third diagrammatic matter;
training, subject to the pictorial object recognition, the AI platform to recognize the reference alphanumerics;
performing, subject to the reference alphanumerics recognition, a contextual analysis of the third textual matter and the third diagrammatic matter;

performing, subject to the reference alphanumerics recognition, a contextual analysis of the third textual matter and the third diagrammatic matter;
performing, subject to the contextual analysis, a second contextual correlation through the third textual material and the third diagrammatic matter;
defining, subject to the second contextual correlation, one or more first mappings between the third textual material and the third diagrammatic matter;
determining, subject to the first mappings, first textual patterns extending through the third textual material and diagrammatic textual content resident within the third diagrammatic matter; and
executing, subject to the first textual patterns, a first contextual alignment of the third textual material and the third diagrammatic matter.

15. The method of claim 10, wherein bilaterally translating at least one of the first textual material and the first diagrammatic matter to at least one of the second textual material and the second diagrammatic matter comprises:
determining one or more second semantic relationships extending through the first textual material; and
determining subject to the second semantic relationships determination, a third contextual correlation thereof.

16. The method of claim 15, wherein bilaterally translating at least one of the first textual material and the first diagrammatic matter to at least one of the second textual material and the second diagrammatic matter further comprises:
determining, subject to the third contextual correlation, an identity of one or more portions of the first textual material to be associated with one or more diagrams to be generated, wherein the one or more diagrams to be generated include at least a portion of the second diagrammatic matter;
assigning, subject to the identity determination, a unique text identifier to each respective portion of the first textual material, thereby at least partially generating the second textual material;
determining, through the diagram analytics, subject to the identity determination, a number of the diagrams to be generated;
determining, through the diagram analytics, subject to the number of diagrams determination, an order of the diagrams;
determining, through the diagram analytics, subject to the identity determination, a set of diagrammatic objects to be drawn on each diagram;
determining, subject to the diagrammatic objects determination, one or more reference alphanumerics to be assigned to each diagrammatic object;
assigning, subject to the reference alphanumerics assignment, one or more second mappings between the one or more reference alphanumerics and respective unique text identifiers;
generating, subject to the one or more second mappings, the one or more diagrams; and
executing a bilateral second contextual alignment between the first textual material and the second diagrammatic matter, thereby at least partially further generating the second textual material.

17. The method of claim 16, wherein determining the set of diagrammatic objects to be generated comprises:
determining textual content to be added to each flowchart block of a plurality of flowchart blocks.

18. The method of claim 10, wherein bilaterally translating the at least one of the first textual material and the first diagrammatic matter to the at least one of the second textual material and the second diagrammatic matter further comprises:
   determining, through the diagram analytics, an identity of one or more diagrams of the first diagrammatic matter;
   analyzing, through the diagram analytics, subject to the identification determination, the one or more diagrams of the first diagrammatic matter;
   associating, through the diagram analytics, subject to the analysis, portions of the one or more diagrams with second textual material to be generated;
   assigning, subject to the association determination, one or more unique reference alphanumerics to each respective diagrammatic object of the second diagrammatic matter, thereby at least partially generating the second diagrammatic matter;
   determining, subject to the association determination, an extent of the second textual material to be generated;
   determining, subject to the extent determination, an order of the second textual material to be generated;
   generating, subject to the association determination, the one or more unique reference alphanumerics from the respective one or more diagrams to be referenced within the second textual material to be generated;
   defining one or more third mappings between the one or more reference alphanumerics and the respective second textual material to be generated;
   generating, subject to the one or more third mappings, the second textual material; and
   executing a bilateral third contextual alignment between the first diagrammatic matter and the second textual material, thereby at least partially generating the second diagrammatic matter.

19. The method of claim 10, wherein bilaterally translating at least one of the first textual material and the first diagrammatic matter to at least one of the second textual material and the second diagrammatic matter further comprises:
   executing first changes to one of the second textual material and the second diagrammatic matter;
   determining, subject to the executed changes, one or more discrepancies between the second textual material and the second diagrammatic matter;
   determining, subject to the discrepancy determination, one or more locations within the second textual material and the second diagrammatic matter where a lack of synchronization is present between the second textual material and the second diagrammatic matter; and
   executing second changes to one of the second textual material and the second diagrammatic matter to obtain synchronization therebetween, thereby removing the one or more discrepancies.

20. The method of claim 19, wherein training the AI platform further comprises:
   determining the first changes and the second changes are training feedback;
   updating the knowledge corpus with the first changes and the second changes;
   updating the training of the AI platform with the updated knowledge corpus; and
   updating the user profiles with data relating to one or more of the first changes and the second changes.

* * * * *